United States Patent
Sorensen et al.

(10) Patent No.: US 11,478,764 B2
(45) Date of Patent: Oct. 25, 2022

(54) AGITATORS

(71) Applicant: Runway Blue, LLC, Alpine, UT (US)

(72) Inventors: Steven M. Sorensen, Alpine, UT (US); Kim L. Sorensen, Alpine, UT (US); Jim Allen Colby, Highland, UT (US); David O. Meyers, East Layton, UT (US); John R. Omdahl, II, Lindon, UT (US); Joseph O. Jacobsen, American Fork, UT (US); Kurt Lewis Jensen, Spanish Fork, UT (US); Derek John Shelley, Eagle Mountain, UT (US); Dennis Legrand Olsen, Eagle Mountain, UT (US)

(73) Assignee: Runway Blue, LLC, Alpine, UT (US)

( * ) Notice: Subject to any disclaimer, the term of this patent is extended or adjusted under 35 U.S.C. 154(b) by 748 days.

(21) Appl. No.: 16/370,075

(22) Filed: Mar. 29, 2019

(65) Prior Publication Data

US 2019/0299175 A1 Oct. 3, 2019

Related U.S. Application Data

(60) Provisional application No. 62/650,943, filed on Mar. 30, 2018.

(51) Int. Cl.
*B01F 33/25* (2022.01)
*A47J 43/27* (2006.01)
(Continued)

(52) U.S. Cl.
CPC ............ *B01F 33/254* (2022.01); *A47J 43/27* (2013.01); *B01F 33/251* (2022.01);
(Continued)

(58) Field of Classification Search
CPC ..................................................... B01F 33/254
(Continued)

(56) References Cited

U.S. PATENT DOCUMENTS

| 1,060,419 A | 4/1913 | Benjamin |
| 3,088,715 A | 5/1963 | Deindoerfer |

(Continued)

FOREIGN PATENT DOCUMENTS

| AU | 2013101078 A4 | 9/2013 |
| DE | 102006060260 A1 | 6/2008 |

(Continued)

OTHER PUBLICATIONS

International Search Report and Written Opinion issued in International Application No. PCT/US2019/024926, dated Nov. 11, 2019, 21 pages.

*Primary Examiner* — David L Sorkin
(74) *Attorney, Agent, or Firm* — Sterne, Kessler, Goldstein & Fox P.L.L.C.

(57) ABSTRACT

An agitator may include one or more members adjustable between an expanded configuration and a compressed configuration. When the one or more members are in the expanded configuration, the agitator in a first set of two orthogonal dimensions is larger than an opening having a predetermined size. When the one or more members are in the compressed configuration, the agitator in a second set of two orthogonal dimensions is smaller than the opening having the predetermined size. The one or more members are biased to the expanded configuration in absence of external force applied to the one or more members. In use, the agitator may be inserted into a container through a neck of the container in the compressed configuration. The agitator may expand within the container so that the container does not fit through the neck of the container.

26 Claims, 22 Drawing Sheets

(51) Int. Cl.
    *B01F 33/501*           (2022.01)
    *B01F 35/32*            (2022.01)
    *B01F 101/14*          (2022.01)

(52) U.S. Cl.
    CPC .. *B01F 33/50111* (2022.01); *B01F 35/32021* (2022.01); *B01F 2101/14* (2022.01)

(58) Field of Classification Search
    USPC .................................................. 366/130, 242
    See application file for complete search history.

(56) References Cited

U.S. PATENT DOCUMENTS

| | | |
|---|---|---|
| 3,136,532 A | 6/1964 | Rudnick |
| 6,379,032 B1 * | 4/2002 | Sorensen .............. B01F 33/251 |
| | | 366/342 |
| 2006/0250887 A1 | 11/2006 | Vernon |
| 2007/0086271 A1 | 4/2007 | Hamilton |
| 2015/0290605 A1 | 10/2015 | Dayton |
| 2017/0312711 A1 | 11/2017 | Cuervo |

FOREIGN PATENT DOCUMENTS

| | | |
|---|---|---|
| FR | 2 667 827 A1 | 4/1992 |
| WO | 2019/152954 A1 | 8/2019 |

\* cited by examiner

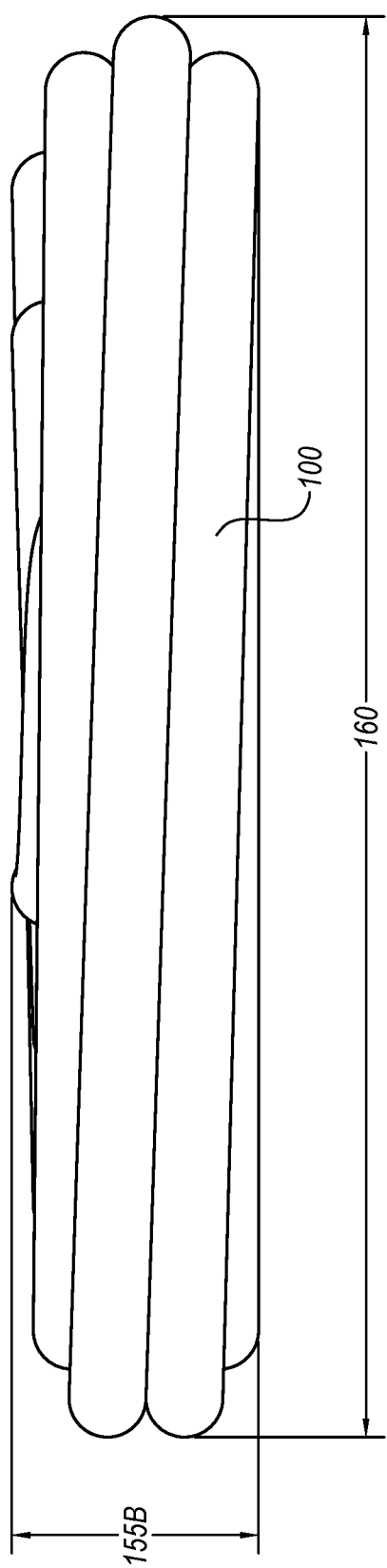

AGITATORS

CROSS-REFERENCE TO RELATED APPLICATION

This application claims the benefit of US Provisional Patent Application No. 62/650,943, filed Mar. 30, 2018, which is incorporated herein in its entirety, by reference thereto.

FIELD

This disclosure relates generally to agitators.

BACKGROUND

Agitators can be used to mix materials within a container. Agitators may be inserted into a container with the materials to be mixed. When the container is shaken, the agitator may move within the container and may mix the materials.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments of the subject disclosure, an agitator can be used for mixing materials within a container and has a compressed configuration and an expanded configuration. The compressed configuration and the expanded configuration of the agitator may be related to one or more factors/events such as an external force applied to the agitator, maintaining the agitator in a particular configuration (e.g., for a period of time), a size/shape of any portion of the container, or any other suitable factor/event.

In some embodiments of the subject disclosure, the container may hold or contain liquids, beverages, drinks, and the like. The container may allow water and other types of fluids to be transported and/or consumed. For example, the container may be used to transport or consume water, flavored waters, juices, vitamin enhanced beverages, energy drinks, thirst-quenchers and the like. In addition, the container may hold mixtures and solutions, which may include vitamins, supplements, protein powders, meal replacements, etc. Further, the container may hold various powders, solids, liquids, and/or other types of materials including foodstuffs such as fruits, vegetables, soups, dressings, and the like. In some embodiments, the container may be insulated to help keep the contents at a desired temperature. The container may be a bottle, cup, vessel, or the like, and the container may have a variety of different shapes, sizes, configurations, and arrangements depending, for example, upon the intended use of the container.

In an example, a method comprises inserting an agitator into a container through a neck of the container. The method also comprises expanding the agitator within the container so that the agitator does not fit through the neck of the container.

In another example, a mixing system comprises a container and an agitator. The container comprises a neck having an opening therein. The agitator has an expanded configuration and a compressed configuration. The agitator is adjustable between the expanded configuration and the compressed configuration in at least one of a length dimension, a width dimension, or a height dimension. The agitator in the expanded configuration is too large to fit through the neck of the container in any orientation of the agitator relative to the neck. The agitator in the compressed configuration is small enough to fit through the neck of the container in at least one orientation of the agitator relative to the neck. The agitator is biased to the expanded configuration in absence of external force applied to the agitator.

In another example, an agitator comprises one or more members. The one or more members are adjustable between an expanded configuration and a compressed configuration. When the one or more members are in the expanded configuration, the agitator in a first set of two orthogonal dimensions is larger than an opening having a predetermined size. When the one or more members are in the compressed configuration, the agitator in a second set of two orthogonal dimensions is smaller than the opening having the predetermined size. The one or more members are biased to the expanded configuration in absence of external force applied to the one or more members.

These and other aspects, features, and advantages of the subject technology will become more fully apparent from the following brief description of the drawings, the drawings, the detailed description, and appended claims.

BRIEF DESCRIPTION OF THE FIGURES

The appended drawings are incorporated in and constitute a part of this description, and contain figures of certain embodiments to further disclose the above and other aspects, principles, advantages, and features of the subject technology. It will be appreciated that these drawings depict only certain embodiments and are not intended to limit the scope of the invention. Additionally, it will be appreciated that while the drawings may illustrate certain sizes, scales, relationships, and configurations of the subject technology, the drawings are not intended to limit the scope of the claimed invention.

FIG. 2C illustrates a front view of the agitator of FIG. 1A in a compressed configuration in accordance with some embodiments.

DETAILED DESCRIPTION

Figure 1A:
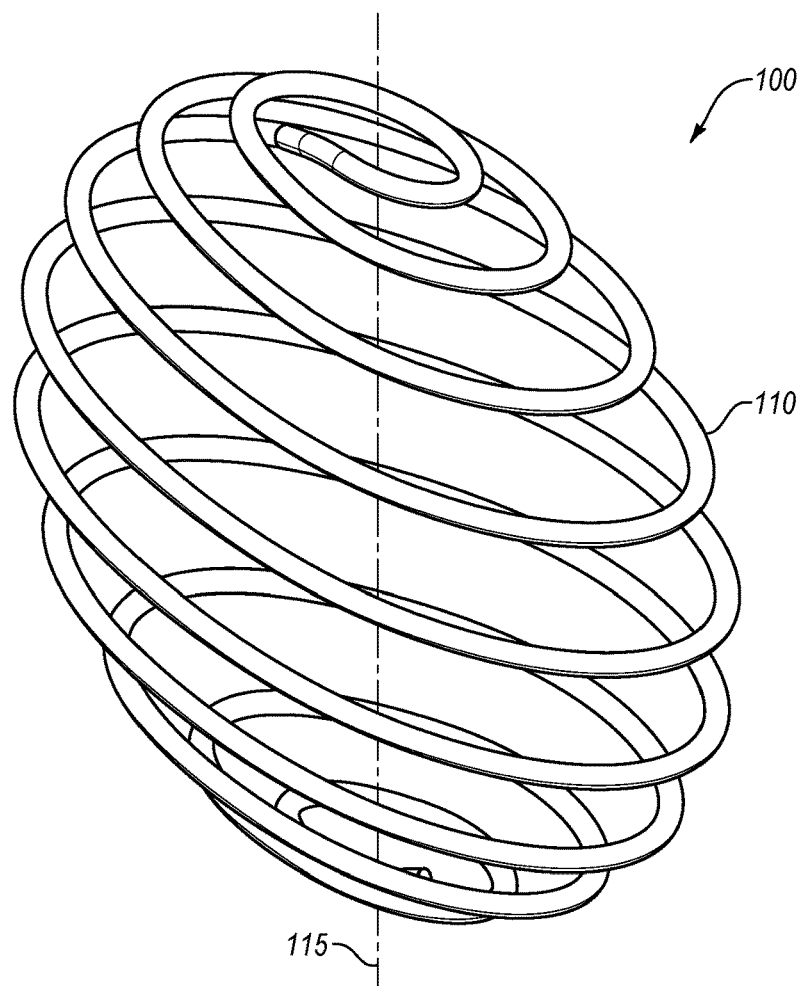
FIG. 1A illustrates an upper perspective view of an example agitator in accordance with some embodiments.

Agitators can be used to mix materials. For example, agitators can be used to mix powdered food supplements with liquids. Mixing powder, such as dietary supplements, drink mixes, baby formulas and others, with liquids can be difficult. For example, powder can clump forming aggregations of powder surrounded by a thick layer of paste that inhibits liquid from penetrating into the clump. These clumps may float, sink to the bottom of the container or remain suspended at some level in the fluid. Powder may also stick to the sides or bottom of a container and resist mixing by simple shaking. Use of an agitator may aid complete dispersion of clumps and aggregations on the container walls. Use of an agitator also can assist in mixing together multiple liquids. For example, an agitator can be used to mix syrup and water.

Some aspects of the present disclosure relate to agitators that may fit through container openings (hereinafter, "container neck," "neck of a container," or "neck"), such as, for example, those of many commercially available liquid containers, whether sold empty or while containing liquids (e.g., bottled water). The agitator may have an expanded configuration and a compressed configuration. The agitator may be adjustable between the expanded configuration and the compressed configuration in one or more of a length dimension, a width dimension, and a height dimension. In some embodiments, when the agitator is in the expanded configuration, the agitator may be too large to fit through the neck of the container in any orientation of the agitator relative to the neck. In contrast, when the agitator is in the compressed configuration, the agitator may be small enough to fit through the neck of the container in one or more orientations of the agitator relative to the neck. For example, a user may push the agitator in the compressed configuration through the neck of the container and, after entering the container, the agitator may expand to the expanded configuration.

In some embodiments, the agitator may include wire or drawn metal of any shape or thickness. In at least one embodiment, the wire or drawn metal may be 22 gauge, 20 gauge, 18 gauge, 16 gauge, 14 gauge steel, or 12 gauge steel. The agitator may be formed from any material, including any suitable polymer, plastic, silicone, metal, and/or a low-corrosion material. In at least one embodiment, the agitator as described herein may be formed from a food-grade and/or a medical grade steels, such as 316, 420, 440, 304, 18/8, 18/10, among potentially other grades of steel. The agitator may also be configured to be any weight, such that the agitator may float on top of material in the container, be suspended within material in the container, or sink to the bottom of the container. In at least one embodiment, the agitator may weigh between 2 and 20 grams. In at least one embodiment, the agitator may weigh approximately 6 grams.

Some agitators of the present disclosure may include a frame structure. In the expanded configuration, the frame structure may include a primary coil shape and a secondary coil shape. The primary coil shape may include a collective shape or overall shape of the agitator as a whole when in the expanded configuration (e.g., spheroid shape of FIG. 8A). The secondary coil shape may include a shape of a subset of the agitator as a whole, for example, a section, a module, a portion, a cross-section, a single coil, etc. (e.g., a D shape of FIG. 8F). In some embodiments, the primary coil shape may include any of a toroidal, spherical, ellipsoid, prolate, or spheroid shape. Other suitable shapes may be implemented as the primary coil shape. Additionally or alternatively, in some embodiments, the secondary coil shape may include any of a circular, hemispherical, D, ellipsoid, or prolate shape. Other suitable shapes may be implemented as the secondary coil shape. Additionally or alternatively to the primary/secondary coil shape of the agitator, the frame structure of the agitator may include any of a bend, a fold, a turn, a spiral, a slot, an aperture, a spoke, a flange, a fin, a webbing, or any other suitable feature.

In at least one embodiment, the agitator may include a retainer that is configured to hold the agitator in the compressed configuration. When the retainer is activated (e.g., released), the agitator may change from the compressed configuration toward the expanded configuration. The retainer may include a liquid-activated material that is altered when the retainer comes in contact with a liquid. For example, the liquid-activated material may be attached to the agitator in such a way as to maintain the agitator in the compressed configuration. When contacted by liquid, the liquid-activated material may be altered (e.g., dissolve, expand, contract, etc.) such that it no longer maintains the agitator in the compressed configuration. In at least one embodiment, the retainer may be force- and/or impact-activated such that when a force or impact is applied to the retainer, the agitator may change from the compressed configuration to the expanded configuration. For example, a user may insert the agitator into a container and then may shake the container. The shaking of the container may activate the retainer, e.g., by breaking the retainer and/or by causing the retainer to disengage from at least a portion of the agitator, such that the retainer no longer is able to maintain the agitator in the compressed configuration. The agitator then may change to the expanded configuration. The retainer may be any type of mechanism that may be used to maintain the agitator in the compressed configuration and may use any number of supports, locks, pins, springs, etc.

In some embodiments, the agitator as described in the present disclosure may be configured to be packaged. For example, the package may be disposable (e.g., wrapped in plastic, cardboard, etc.). The agitator may be packaged in the compressed configuration or the expanded configuration. In some embodiments, when the agitator is packaged in the compressed configuration, the packaged agitator may include a slim profile and/or may fit into a wallet, a pocket, etc. Additionally or alternatively, in some embodiments when the agitator is packaged in the compressed configuration, the packaged agitator may be packaged with other agitators (e.g., agitators also in the compressed configuration) in the same packaging.

FIG. 1A illustrates an upper perspective view of an agitator 100 in accordance with some embodiments. In some embodiments, the agitator 100 may include a frame structure 110. The frame structure 110 may include one or more members. The one or more members may include wire members and/or mixing members. Material to be mixed may move through, across, and/or around the one or more members. FIG. 1A illustrates the agitator 100 in an expanded configuration.

The agitator 100 may be compressible in at least one direction, such as along an axis 115, which may be a longitudinal axis. Additionally or alternatively, as illustrated in FIG. 1A in the expanded configuration, the agitator 100 may include a primary coil shape of an ovoid shape or egg shape. The agitator 100 may include a secondary coil shape that is generally oval or oblong in at least one view, such as, for example, when viewed from above (see FIG. 1B). Such a view may be along an axis of compression. The frame structure 110 can include a spiral that increases in size with each turn, for example beginning from each of a top and bottom of the agitator 100 toward about a middle (in the vertical direction, e.g., the direction of the longitudinal axis 115 in the example of FIG. 1A) of the agitator 100. Each complete turn of the spiral is approximately oval or oblong when viewed from above.

Figure 1B:
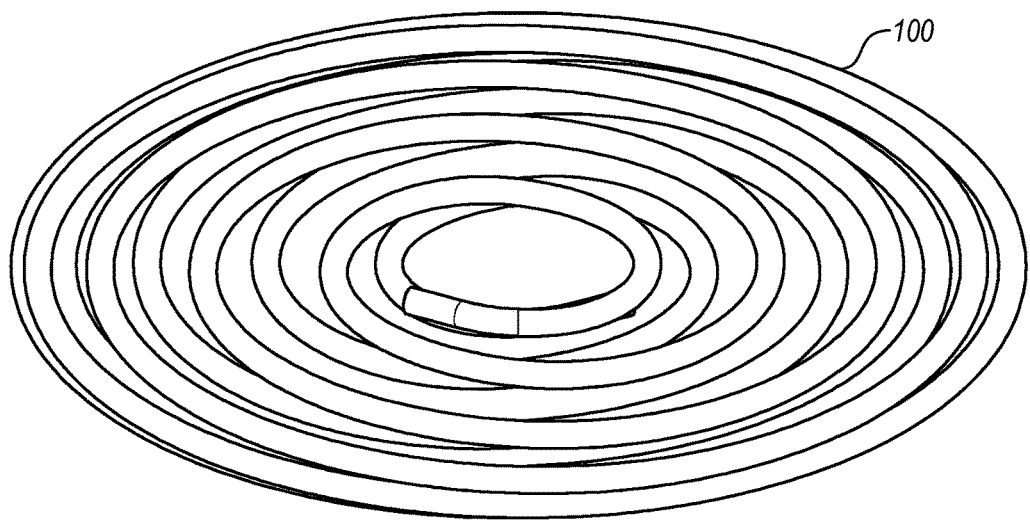
FIG. 1B illustrates a top view of the agitator of FIG. 1A in accordance with some embodiments.

FIG. 1B illustrates a top view of the agitator 100 of FIG. 1A in accordance with some embodiments. As illustrated in FIG. 1B, the agitator 100 includes a substantially oval footprint with a major axis that runs side-to-side in the orientation of FIG. 1B and a minor axis that runs vertically in the orientation of FIG. 1B. The minor axis of the agitator 100 may be configured to fit within an inner diameter (or other characterizing dimension(s)) of a neck of a container while the major diameter may be larger than the inner diameter of the neck of the container. When in the compressed configuration, the agitator 100 may be inserted from at least one orientation into the neck of the container. The container may be the same as or similar to a container of, e.g., FIG. 3, 4, 18A, 18B, or any other suitable container.

Figure 2B:
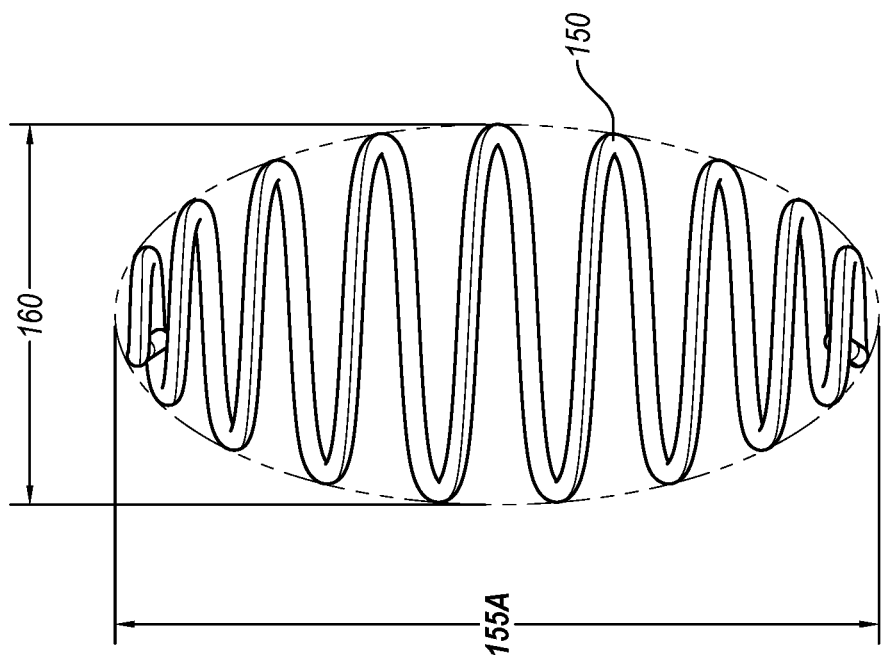
FIG. 2B illustrates a front view of the agitator of FIG. 1A in accordance with some embodiments.
Figure 2A:
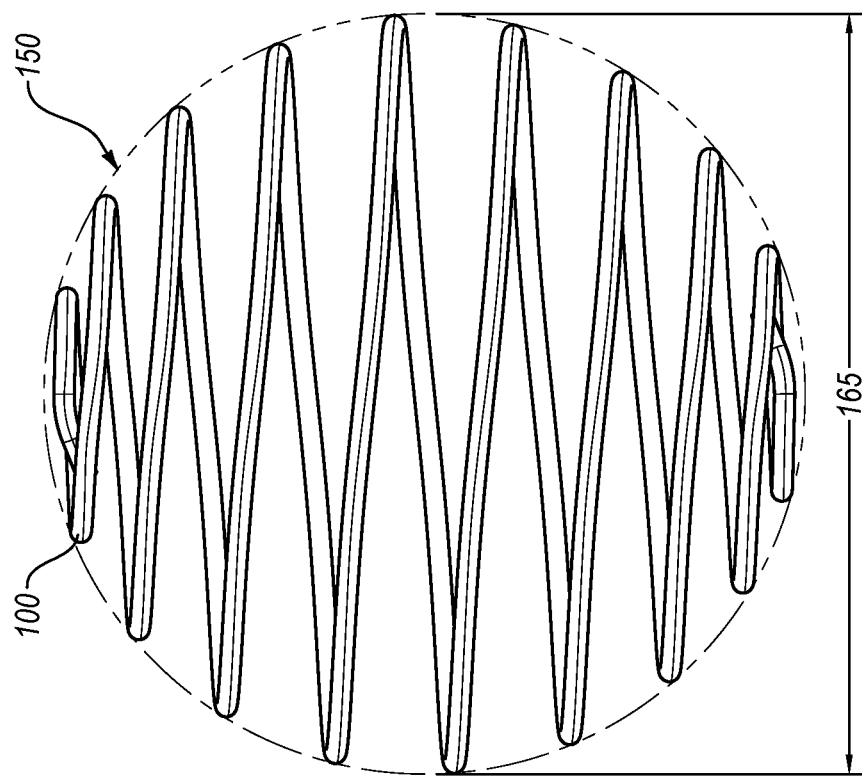
FIG. 2A illustrates a side view of the agitator of FIG. 1A in accordance with some embodiments.

FIG. 2A illustrates a side view of the agitator 100 of FIG. 1A in accordance with some embodiments. The agitator 100 is illustrated in the expanded configuration in FIG. 2A. In the expanded configuration, the agitator 100 from the side view of FIG. 2A has an overall length 165, which in this example embodiment may correspond to a major axis of the agitator or one or more major axes of the one or more members of the agitator 100. Also shown in FIG. 2A is a profile 150 of the agitator 100. From the side view of FIG. 2A, the profile 150 is circular. More generally, the profile 150 may be oval, oblong, circular, polygonal, or other suitable shape. In at least one embodiment, the overall length 165 of the agitator 100 may be between 0.5 and 3 inches from end to end. In at least one embodiment, the overall length 165 of the agitator 100 may be approximately 1.5 inches.

FIG. 2B illustrates a front view of the agitator 100 of FIG. 1A in accordance with some embodiments. The agitator 100 is illustrated in the expanded configuration in FIG. 2B. In the expanded configuration, the agitator 100 from the front may have an overall width 160, which in this example embodiment may correspond to a minor axis of the agitator or one or more minor axes of the one or more members of the agitator 100. In the orientation of FIG. 2B, the profile 150 is generally oval or oblong, but may more generally have any suitable shape. As illustrated, the agitator 100 has an overall height 155A. In at least one embodiment, the overall height 155A of the agitator 100 may be between 0.5 and 3 inches, and the overall width 160 may be between 0.25 and 1 inches. In at least one embodiment, the overall height 155A of the agitator 100 may be approximately 1.5 inches from end to end and the overall width 160 may be approximately 0.75 inches. In at least one embodiment, the overall width 160 of the agitator 100 may be configured to fit within a commercially available liquid container. More particularly, the overall width 160 may be configured to fit through a neck of a commercially available liquid container.

For convenience and clarity of explanation, some dimensions of the agitators discussed herein are referenced using the terms "height," "width," and "length." These terms refer to distances measured in any three mutually orthogonal directions. They are not intended to be limiting with respect to any particular orientation in space.

FIG. 2C illustrates a front view of the agitator 100 of FIG. 1A in the compressed configuration in accordance with some embodiments. In the compressed configuration, the agitator 100 has an overall height 155B and the overall width 160, each of which may be smaller than a diameter of a neck of a container. Thus, in the compressed configuration, the agitator 100 may be inserted into the container through the neck of the container.

After passing through the neck of the container, the agitator 100 may change to the expanded configuration in which the agitator 100 has the overall height 155A (see FIG. 2B) and the overall length 165 (see FIG. 2A) that are each larger than the diameter of the neck of the container. As such, the agitator 100 may be unable to exit the container through the neck of the container when in the expanded configuration.

Figure 3:
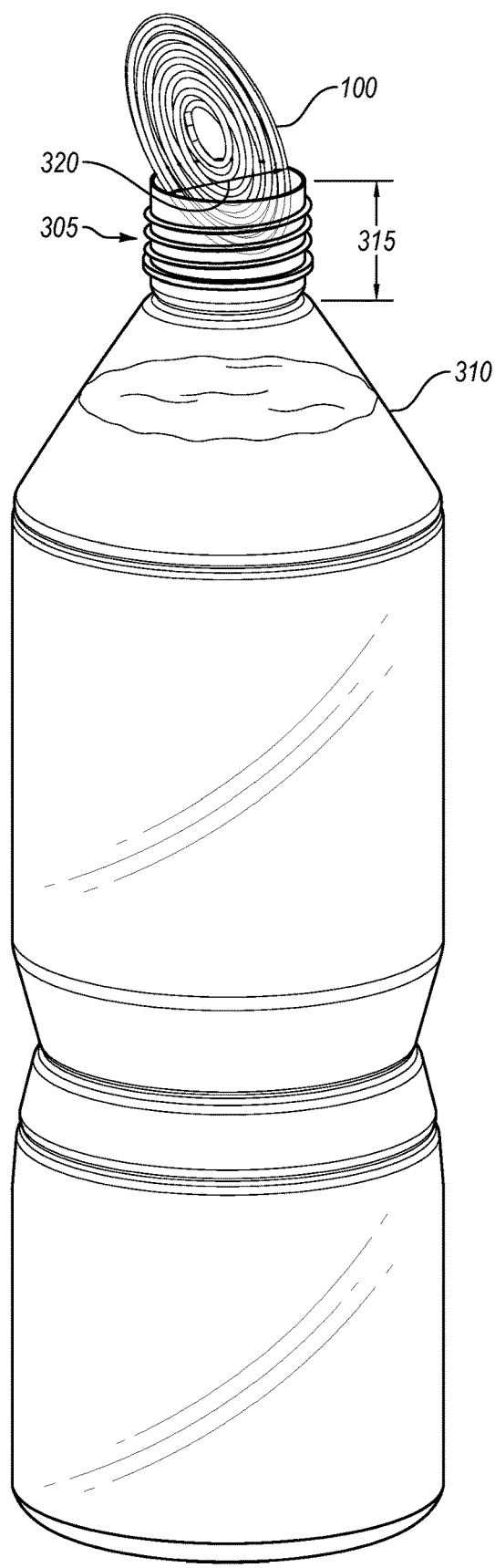
FIG. 3 illustrates insertion of the agitator of FIG. 1A in the compressed configuration into an example container in accordance with some embodiments.

FIG. 3 illustrates insertion of the agitator 100 in the compressed configuration into an example container 310 in accordance with some embodiments. The container 310 includes a neck 305. As shown in FIG. 3, the container 310 may be a transparent bottle, with external threads formed on its neck 305. Such a bottle may be, for example, a disposable/recyclable soft drink or sports drink bottle, such as one may purchase pre-filled with a beverage. The agitator 100 is an example agitator that may be inserted into the container 310, but any other agitator embodiment as described in the present disclosure may be implemented to accomplish the same or similar functionality in connection with the container 310. As illustrated, the neck 305 may include an inner diameter 320 (or other characterizing dimension(s)) and a neck height 315. In some embodiments, the agitator 100 may be compressible from the expanded configuration to the compressed configuration, as further described below with respect to this and various other agitator embodiments. The agitator 100 may be compressible in a direction such that the compressed agitator includes a substantially oval footprint. For example, in at least one embodiment, the agitator 100 may be compressible along the axis 115.

In at least one embodiment, the size of the agitator 100 in the compressed configuration may be configured to fit within a neck of a commercially available liquid container. For example, one or more dimensions of the agitator 100 in the compressed configuration may be less than the inner diameter 320 of the neck 305. As a specific example, both the overall width 160 and the overall height 155B of the agitator 100 in the compressed configuration may be less than the inner diameter 320 (or other characterizing dimension(s)) of the neck 305. In at least one embodiment, the inner diameter 320 of the neck 305 may be between 0.125 and 1.5 inches.

In some embodiments, the neck 305 may be, with respect to size dimensions, a smallest portion of the container 310. For example, the inner diameter 320 (or other characterizing dimension(s)) and the neck height 315 may be smaller than dimensions of other portions of the container. In some embodiments, portions of the container 310, excluding the neck 305, may have an inner diameter (or other characterizing dimension(s)) that is larger than the inner diameter 320 of the neck 305, e.g., 1.5, 2-4, and/or 5-8 times larger. Additionally or alternatively, portions of the container 310 other than the neck 305 may have a height that is 2-4, 5-8, 9-12, 13-15, and/or 16-20 times larger than the neck height 315. Other suitable dimensions of various portions of the container 310 (excluding the neck 305) may be implemented in the container 310 such that they are larger than the dimensions of the neck 305.

In some embodiments, the agitator 100 may be inserted into the container 310 through the neck 305. To insert the agitator 100 through the neck 305, the agitator 100 may be compressed into the compressed configuration, for example, prior to inserting the agitator 100 into the neck 305 or during insertion of the agitator 100 into the neck 305. In some embodiments, compressing the agitator 100 may include adjusting one or more members of the agitator 100 from the expanded configuration to the compressed configuration. Selective members of the one or more members may be adjustable or in some embodiments each of the one or more members may be adjustable such that the adjusted one or more members are adjusted in one or more dimensions, such as a width dimension (e.g., width 160), a length dimension (e.g., length 165), and a height dimension (e.g., height 155A, 155B).

In some embodiments, the agitator 100 in the compressed configuration may be small enough to fit through the neck 305 of the container 310 in at least one orientation of the agitator 100 relative to the neck 305 of the container 310. In these or other embodiments, the agitator 100 may have dimensions, such as the length dimension, the width dimension, and/or the height dimension, that are smaller than one or more of: the inner diameter 320 of the neck 305, the inner diameter 320 of the neck 305 divided by sin(45°), and the inner diameter 320 of the neck 305 plus the neck height 315. Additionally or alternatively, when the agitator 100 is in the compressed configuration, one or more of the length dimension, the width dimension, and the height dimension may be smaller than 0.75 inches or other suitable measurement. Additionally or alternatively, the agitator 100 in the compressed configuration may be smaller than 0.5 inches by 0.5 inches, 0.75 inches by 0.75 inches, 1 inch by 1 inch, or some other suitable measurement in two mutually orthogonal directions. For example, the agitator 100 in the compressed configuration may have two mutually orthogonal dimensions (e.g., height and width) that are each less than 1 inch. Such dimensioning may allow the agitator 100 to be easily inserted into a neck opening of a common disposable/recyclable soft drink bottle, which often have neck openings with inner diameters between 0.75 inches and 1 inch. Also for example, the agitator 100 in the compressed configuration may have two mutually orthogonal dimensions (e.g., height and width) that are each less than 1.25 inches. Such dimensioning may allow the agitator 100 to be easily inserted into a neck opening of a common disposable/recyclable sports drink bottle, which often have neck openings with inner diameters around 1.25 inches.

Additionally or alternatively, one or more of the length dimension, the width dimension, and the height dimension of the agitator 100 in the compressed configuration may be less than the corresponding length dimension, the width dimension, and the height dimension of the agitator 100 in the expanded configuration by a predetermined amount or a predetermined percentage. For example, the overall height 155B of the agitator 100 in the compressed configuration may be at least 0.25 inches, 0.5 inches, or 1 inch less than the overall height 155B of the agitator 100 in the expanded configuration. Alternatively or additionally, the overall height 155B of the agitator 100 in the compressed configuration may be at least 10%, 15%, 20%, 25%, . . . , 90% or more less than the overall height 155B of the agitator 100 in the expanded configuration. The predetermined amount and the predetermined percentage may be tailored to one or more types of containers such as the container 310 and the corresponding necks thereof such as the neck 305. In this manner, the agitator 100 in the compressed configuration may be small enough to fit in or fit through the neck 305 in some orientation.

The agitator 100 may be inserted into the neck 305 portion by portion. In some embodiments, as the agitator 100 is inserted into the neck 305, the agitator 100 may be compressed portion by portion (e.g., to fit within the spatial dimensions of the neck 305). In these or other embodiments, the agitator 100 may compress into the compressed configuration during insertion into the neck 305 in response to one or both of an external force (e.g., from a user hand or a robotic arm) and a force exerted upon the agitator 100 by the neck 305. Portions of the agitator 100 (e.g., one or more members of the agitator 100) may continue to compress into (or be maintained in) the compressed configuration until one or both of the external force and the force applied by the neck to the respective compressed portions of the agitator 100 are removed. Additionally or alternatively, the agitator 100 may remain in the compressed configuration after passing through the neck 305 as described below with respect to with FIGS. 17A-18B.

As the agitator 100 advances portion by portion past the neck 305 of the container 310, the agitator 100 may expand, e.g., portion by portion, incrementally, logarithmically, slowly then suddenly, in pulses, rapidly, after a duration of time, as a function of kinetic energy from insertion of the agitator 100 and/or kinetic energy from a liquid in contact with the agitator 100, as a function of solubility, as a function of impact force against walls of the container 310, etc. The agitator 100 may expand to the expanded configuration from the compressed configuration as a result of the agitator 100 being biased to the expanded configuration. For example, one or more members of the agitator 100 may be biased to the expanded configuration in absence of external force applied to the one or more members. Thus, in some embodiments, the agitator 100 may be fully resilient and return completely to the expanded configuration from the compressed configuration (e.g., zero plastic deformation involved). Additionally or alternatively, the agitator 100 may be partially resilient and may not return completely to the expanded configuration from the compressed configuration, in which case semi-resilient expansion is still an expanded configuration (e.g., some plastic deformation involved).

In these or other embodiments, as the agitator 100 advances portion by portion through the neck 305, the agitator 100 may be in multiple states of compression and expansion at the same time. The expanded configuration and the compressed configuration of the agitator 100 is not limited to two distinct states or positions. The agitator 100 may, in some embodiments, be configured in some compressed/expanded position between a spectrum ranging from fully compressed to fully expanded. For example, a first portion of the agitator 100 may be inserted first through the neck 305. As the agitator 100 advances portion by portion through the neck 305, the first portion may begin expanding (after passing through the neck 305) within an interior of the container 310 having larger dimensions relative to the neck 305. A second portion of the agitator 100 may also be inserted through the neck 305 after the first portion. While the second portion moves within the neck 305, the second portion may further compress and/or maintain compression. At the same time as the further compressing and/or maintained compression of the second portion, the first portion may be expanding within an interior of the container 310. Additionally or alternatively, a third portion may be inserted through the neck 305 after both of the first portion and the second portion of the agitator 100. While the second portion may further compress and/or maintain compression within the neck 305, and while the first portion may begin expanding within the interior of the container, the third portion of the agitator 100 not yet inserted into the neck 305 may be fully expanded or may be beginning to compress. Thus, the compressed configuration and the expanded configuration of the agitator 100 may include a variety of compressed/expanded positions, which may occur at respective portions of the agitator 100 and at the same or different times.

Figure 4:
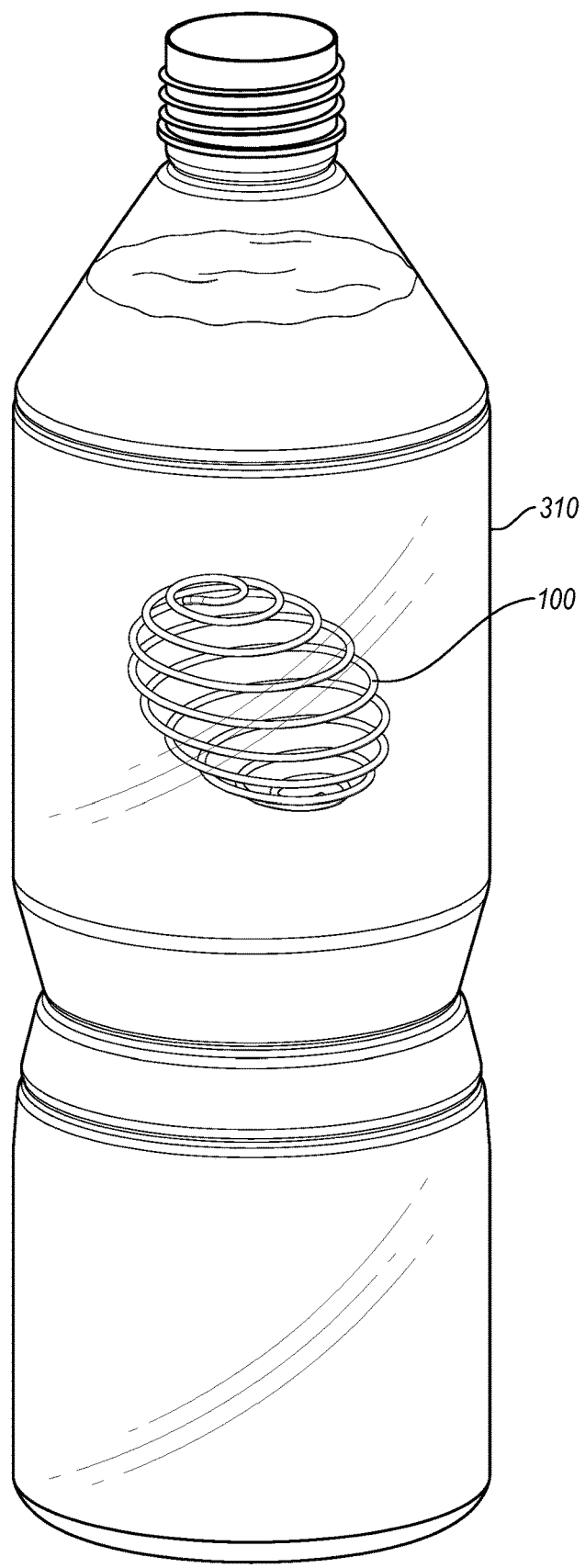
FIG. 4 illustrates the agitator of FIG. 1A in an expanded configuration within the container of FIG. 3 in accordance with some embodiments.

As illustrated in FIG. 4, the agitator 100 may expand within the container 310 to or toward the expanded configuration so that the agitator 100 does not fit through the neck 305 of the container 310. In some embodiments, the agitator 100 in the expanded configuration may be too large to fit through the neck 305 of the container 310 in any orientation of the agitator 100 relative to the neck 305. For example, the overall length 165 and the overall height 155A of the agitator 100 in the expanded configuration may each be larger than the inner diameter 320 of the neck 305. Additionally or alternatively, the neck height 315 may inhibit the agitator 100 from fitting through the neck 305. For example, in some embodiments in the expanded configuration, the agitator 100 may have two or more dimensions that are inhibitively large relative to the neck 305, for example, a width dimension (e.g., width 160), a length dimension (e.g., length 165), and a height dimension (e.g., height 155A). More particularly, in some embodiments, two or more of the width dimension, the length dimension, and the height dimension may be greater than one or more of: the inner diameter 320 of the neck 305, the inner diameter 320 of the neck 305 divided by) sin(45°, the inner diameter 320 of the neck 305 plus the neck height 315, etc. In these or other embodiments, the width dimension, the length dimension, and the height dimension may be mutually orthogonal.

In some embodiments, the agitator 100 in the expanded configuration may have the length dimension, the width dimension, and the height dimension be greater than 0.75 inches (or other suitable measurement). Additionally or alternatively, the agitator 100 in the expanded configuration may have a size equal to or greater than 0.5 inches by 0.5 inches, 0.75 inches by 0.75 inches, 1 inch by 1 inch, or other suitable measurement in two mutually orthogonal directions. For example, the agitator 100 in the expanded configuration may have two mutually orthogonal dimensions (e.g., height and length) that are each greater than 1 inch. Such dimensioning may allow agitator 100 to be larger than, and thus not be inadvertently insertable or removable through a neck opening of a common disposable/recyclable soft drink bottle, which often have neck openings with inner diameters between 0.75 inches and 1 inch. Also for example, the agitator 100 in the expanded configuration may have two mutually orthogonal dimensions (e.g., height and length) that are each greater than 1.25 inches in the expanded configuration. Such dimensioning may allow agitator 100 to be larger than, and thus not be inadvertently insertable or removable through a neck opening of a common disposable/recyclable sports drink bottle, which often have neck openings with inner diameters around 1.25 inches.

Additionally or alternatively, the agitator 100 in the expanded configuration may have the length dimension, the width dimension, and/or the height dimension increase from the compressed configuration to the expanded configuration by a predetermined amount or a predetermined percentage. The predetermined amount and the predetermined percentage may be tailored to one or more types of containers such as the container 310 and the corresponding necks thereof such as the neck 305. In this manner, the agitator 100 in the expanded configuration may be too large to fit in or fit through the neck 305.

Figure 5A:
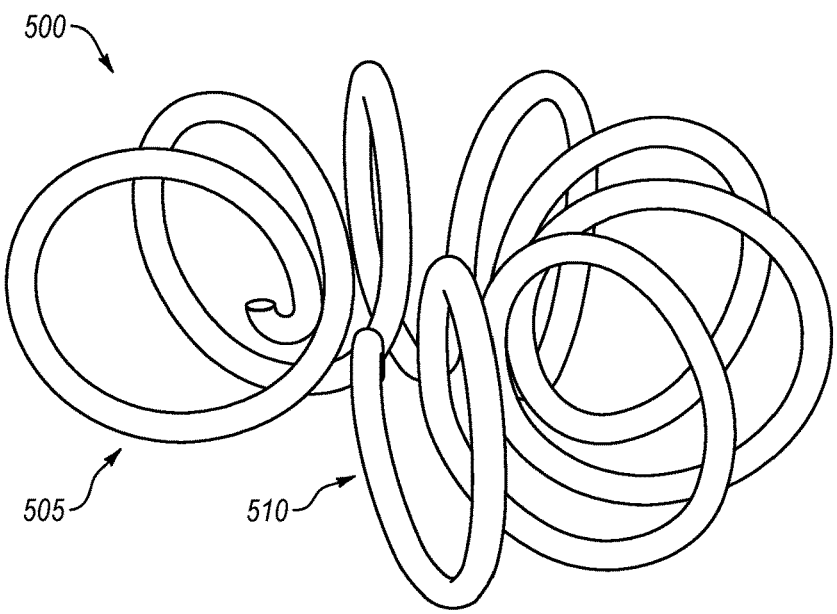
FIG. 5A illustrates an upper perspective view of another example agitator in an expanded configuration in accordance with some embodiments.
Figure 5B:
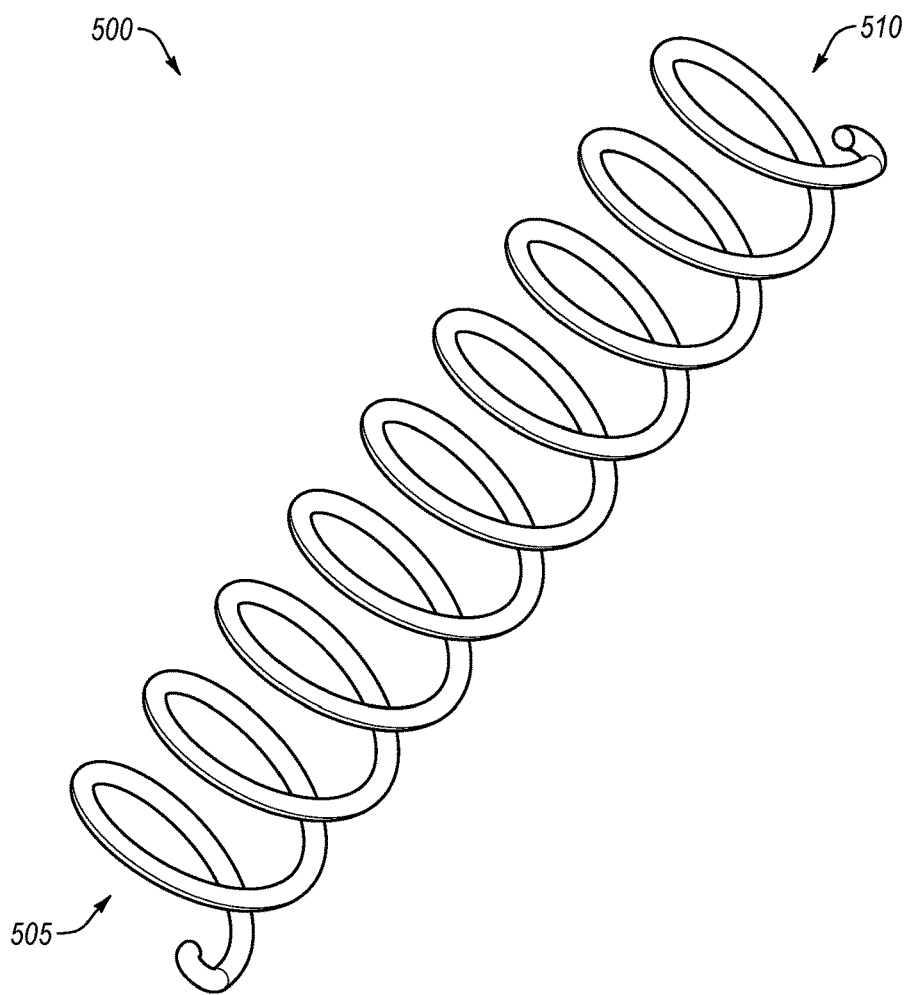
FIG. 5B illustrates an upper perspective view of the agitator of FIG. 6A in a compressed configuration in accordance with some embodiments.

FIG. 5A illustrates an upper perspective view of another example agitator 500 in an expanded configuration in accordance with some embodiments. FIG. 5B illustrates an upper perspective view of the agitator 500 of FIG. 5A in a compressed configuration in accordance with some embodiments. The agitator 500 of FIG. 5A includes a circular helical structure with end portions 505, 510 that may be configured to wrap/twist towards each other, thereby having an overall profile or shape resembling a semi-circle or nearly-full circle. The agitator 500 may also include turns, spirals, coils, etc. In this example embodiment, the agitator of FIG. 5A may be compressed and/or expanded as generally described above with respect to the agitator 100 in FIG. 3. Additionally or alternatively, the agitator 500 of FIG. 5A may be compressed by straightening out the agitator 500 (e.g., pulling/pushing on the respective ends of the agitator 500) to arrive at the compressed configuration of FIG. 5B. In this example embodiment, the agitator 500 may be prepared to be inserted into a neck such as the neck 305. As the agitator 500 advances through the neck 305, the end 505 or 510 inserted first may, additionally or alternatively to the straightening compression, be compressed portion by portion into the compressed configuration in which any of the following may occur individually or in combination: the end 505 or 510 inserted first may become more compressed, the one or more members of the agitator 500 may become closer together, the one or more members may cross into or cross over each other, spirals of the one or more members may become tighter, one or more members of the agitator 500 may stiffen, etc.

As the agitator 500 of FIG. 5B advances past the neck 305, the agitator 500 may expand portion by portion (or by any other suitable manner as described above with respect to the agitator 100 of FIG. 3). For example, as the agitator 500 of FIG. 5B advances past the neck 305, the agitator 500 may expand into the expanded configuration of FIG. 5A in which any of the following may occur individually or in combination: the end 505 or 510 inserted first may become decompressed, the one or more members of the agitator 500 may become farther apart, the one or more members may return from crossing into or crossing over each other, spirals of the one or more members may become larger, and/or one or more members of the agitator may become less stiff, etc.

Figure 6A:
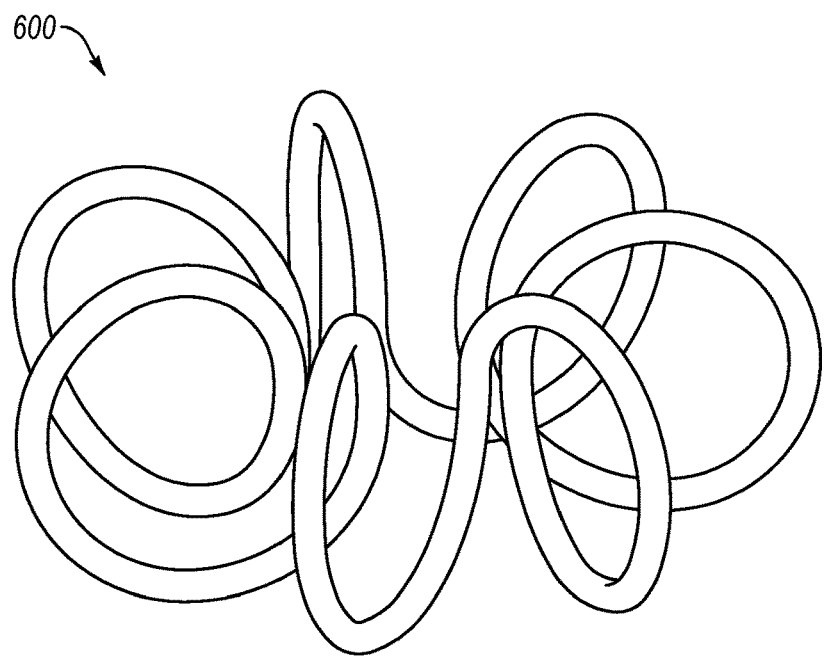
FIG. 6A illustrates an upper perspective view of another example agitator in an expanded configuration in accordance with some embodiments.
Figure 6B:
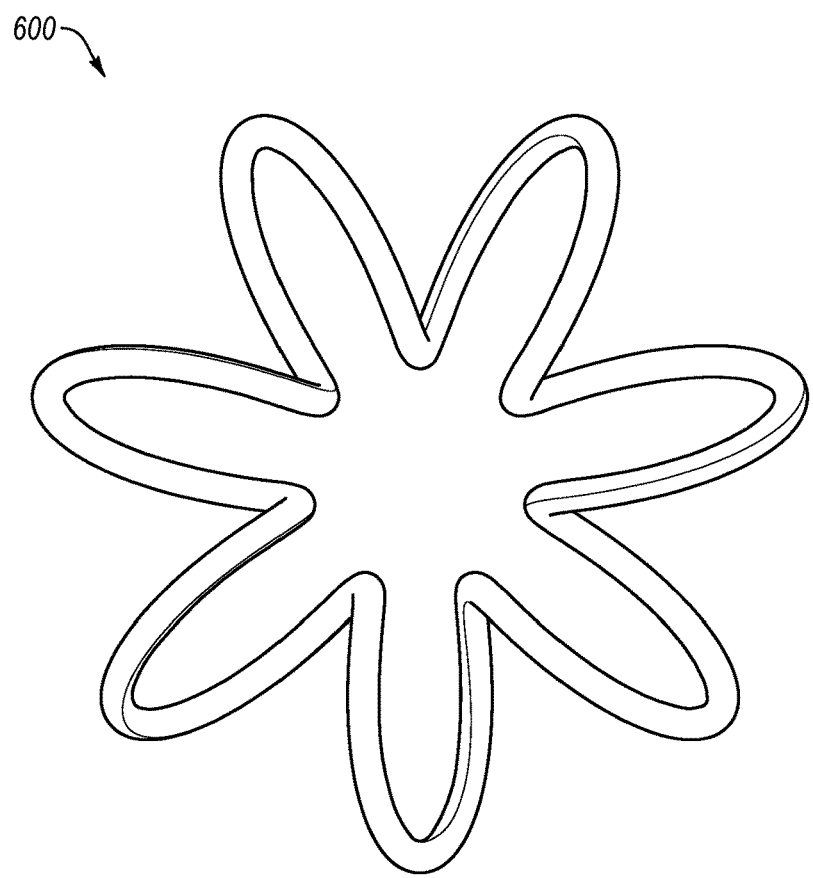
FIG. 6B illustrates a top view of the agitator of FIG. 6A in the expanded configuration in accordance with some embodiments.
Figure 6C:
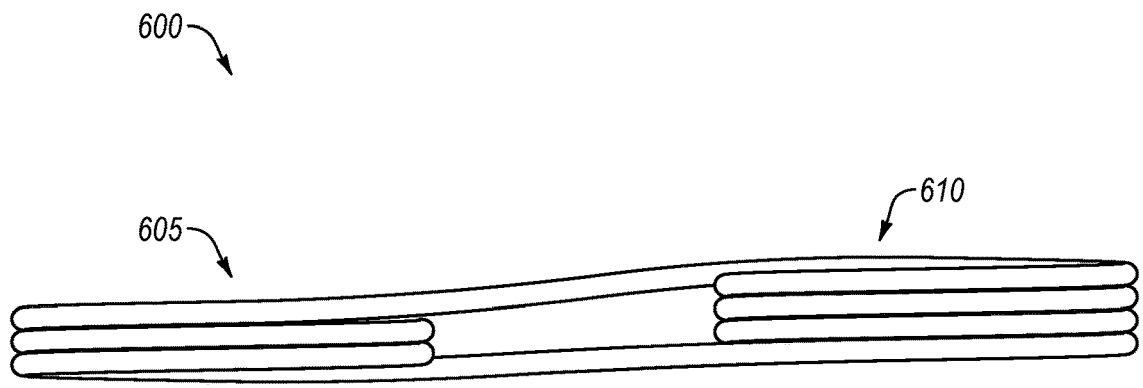
FIG. 6C illustrates a top view of the agitator of FIG. 6A in a compressed configuration in accordance with some embodiments.
Figure 6D:
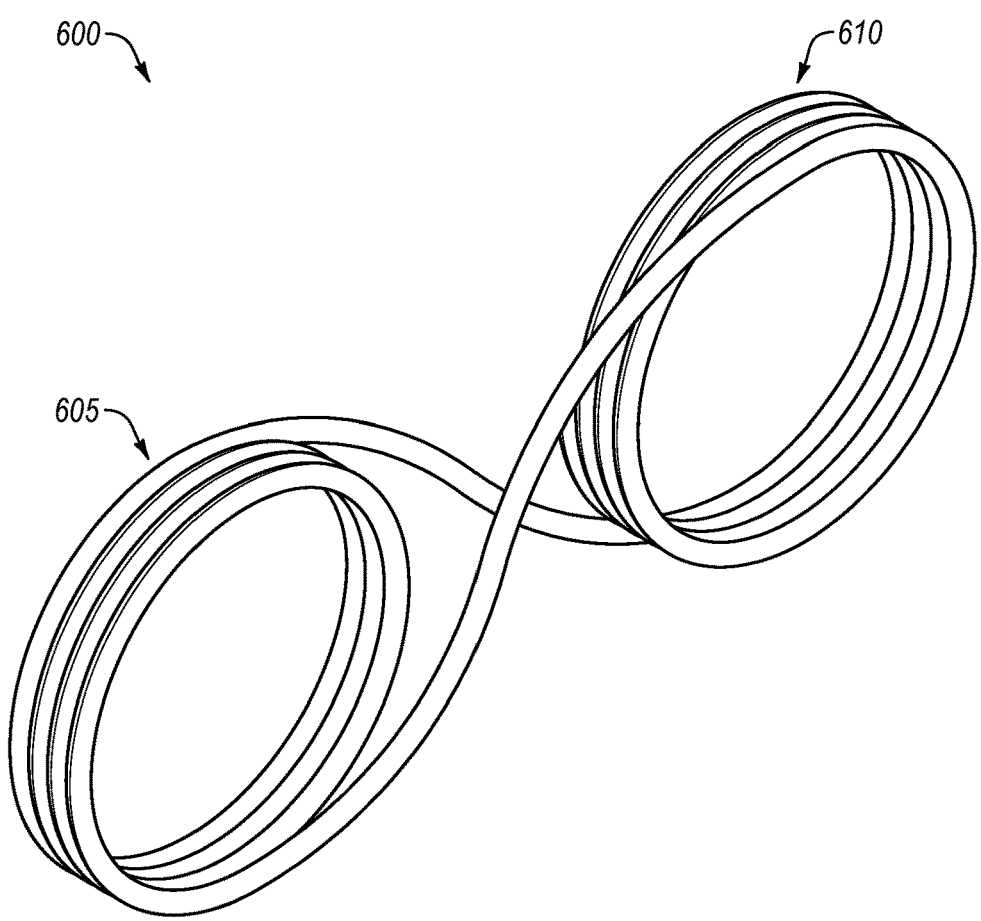
FIG. 6D illustrates a upper perspective view of the agitator of FIG. 6C in the compressed configuration in accordance with some embodiments.

FIG. 6A illustrates an upper perspective view of another example agitator 600 in an expanded configuration in accordance with some embodiments. FIG. 6B illustrates a top view of the agitator 600 of FIG. 6A in accordance with some embodiments. FIG. 6C illustrates a top view of the agitator 600 of FIG. 6A in a compressed configuration in accordance with some embodiments. FIG. 6D illustrates an upper perspective view of the agitator 600 of FIG. 6C in the compressed configuration in accordance with some embodiments.

As illustrated, the agitator 600 of FIGS. 6A-6B may include respective end portions that may be connected to each other or otherwise formed of a single material, thereby forming an overall shape or overall profile such as a closed loop shaped similar to a full circle. The agitator 600 of FIG. 6A may include a helical structure in which ends are wrapped around toward each other and joined. The joined structure may have a circular, toroidal, or other primary coil shape. Similar to the agitator of FIGS. 5A-5B, the agitator 600 of FIGS. 6A-6B may include turns, spirals, coils, etc. In this example embodiment, the agitator 600 of FIGS. 6A-6B may be compressed and/or expanded as described above with respect to the agitator 100 in FIG. 3. Additionally or alternatively, the agitator 600 of FIGS. 6A-6B may be compressed by pinching the agitator 600 (e.g., in half or some other suitable ratio) and pressing the one or more members in the respective pinched portions together to make two distinct circular coil groupings 605, 610 as illustrated in FIGS. 6C and 6D. Additionally or alternatively, the coil groupings 605, 610 of the agitator 600 may be twisted one or more times relative to each other. In this manner, two circles may be formed with crossing members therebetween, similar to an "infinity-symbol" shape (e.g., "∞") to arrive at the compressed configuration of FIGS. 6C-6D. In some embodiments, compression may make a single grouping of coils. In these example embodiments of the compressed configuration, the agitator 600 may be prepared to be inserted into a neck such as the neck 305. As the agitator 600 advances through the neck 305, the coil grouping 605, 610 inserted first may, additionally or alternatively to the coil-grouping/coil-twisting compression, be compressed portion by portion into the compressed configuration in which any of the following may occur individually or in combination: the coil grouping 605, 610 inserted first may form a tighter circular coil grouping or an elongated coil grouping, the two coil groupings 605, 610 may become farther apart, the one or more crossing members may lengthen, one or more members of the agitator 600 may stiffen, etc.

As the agitator 600 of FIGS. 6C-6D advances past the neck 305, the agitator 600 may expand portion by portion (or by any other suitable manner as described above with respect to the agitator 100 of FIG. 3). For example, as the agitator 600 of FIGS. 6C-6D advances past the neck 305, the agitator 600 may expand into the expanded configuration of FIGS. 6A-6B in which any of the following may occur individually or in combination: the coil grouping 605, 610 inserted first may form a looser circular coil grouping or a less elongated coil grouping, the two coil groupings 605, 610 may become closer together, the one or more crossing members may shorten, one or more members of the agitator 600 may become less stiff, the one or more crossing members may uncross, the two coil groupings 605, 610 may return to the closed loop shaped similar to a full circle, etc. Although a closed loop is shown and described with respect to FIGS. 6A-6D, the manner of compressed disclosed with reference to them can be applied to some agitators that do not have a closed loop.

Figure 7:
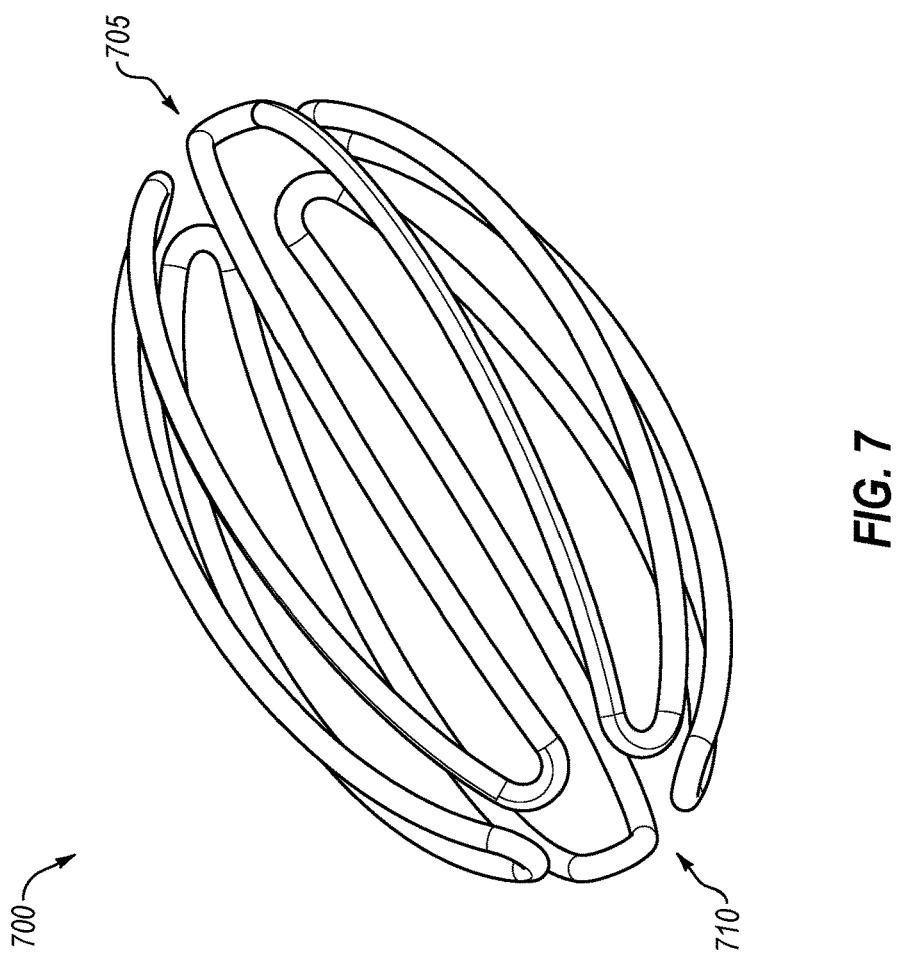
FIG. 7 illustrates an upper perspective view of another example agitator in an expanded configuration in accordance with some embodiments.

FIG. 7 illustrates an upper perspective view of another example agitator 700 in an expanded configuration in accordance with some embodiments. As illustrated, the agitator 700 of FIG. 7 may be shaped as a prolate spheroid (for example, similar to an American football or rugby ball) such that the agitator 700 includes one or more narrowed ends 705, 710. In this example embodiment, the one or more narrowed ends 705, 710 may facilitate compression of the agitator 700. For example, the agitator 700 of FIG. 7 may be compressed and/or expanded as described above with respect to the agitator 100 in FIGS. 3-4. Additionally or alternatively, the agitator 700 of FIG. 7 may be inserted narrowed-end first into a neck such as the neck 305. As the agitator 700 advances through the neck 305, the narrowed end 705, 710 inserted first may compress portion by portion into the compressed configuration in which any of the following may occur individually or in combination: the narrowed end 705, 710 inserted first may become more narrow, the one or more members of the agitator 700 may become closer together, the one or more members may cross into or cross over each other, various folds/turns of the one or more members may further fold or turn, one or more members of the agitator may flatten, etc.

As the agitator 700 of FIG. 7 advances past the neck 305, the agitator 700 may expand portion by portion (or by any other suitable manner as described above with respect to the agitator 100 of FIG. 3). For example, as the agitator 700 of FIG. 7 advances past the neck 305, the agitator 700 may expand into the expanded configuration in which any of the following may occur individually or in combination: the narrowed end 705, 710 inserted first may expand, the one or more members of the agitator 700 may become farther apart, the one or more members may uncross from each other, various folds/turns of the one or more members may fold or turn less, one or more members of the agitator 700 may de-flatten or rise, etc.

Figure 8A:
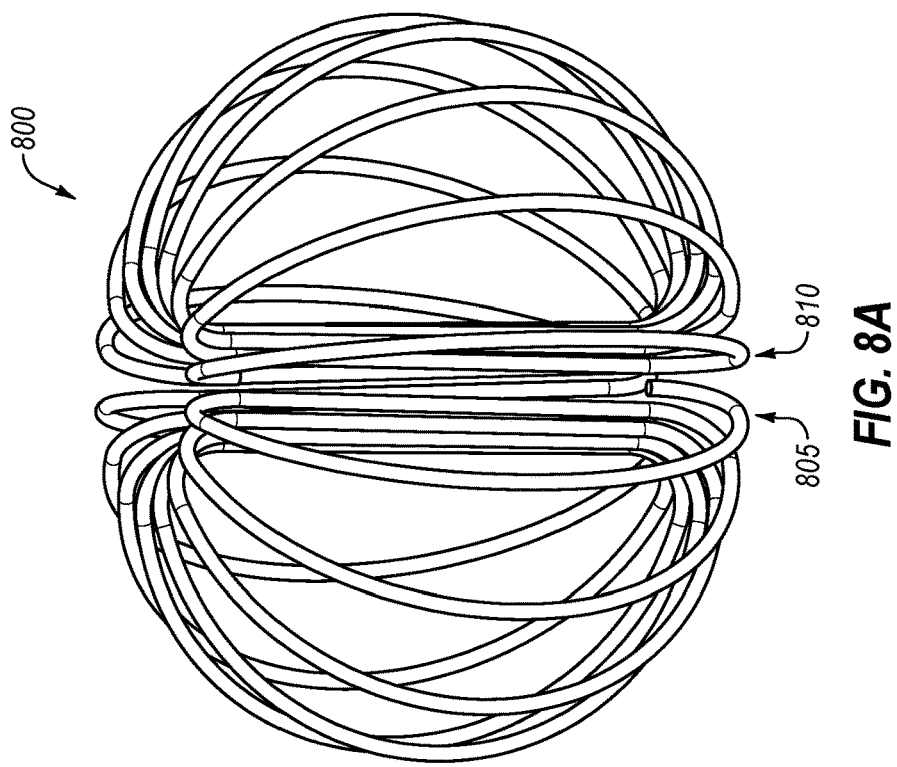
FIG. 8A illustrates an upper perspective view of another example agitator in an expanded configuration in accordance with some embodiments.
Figure 8C:
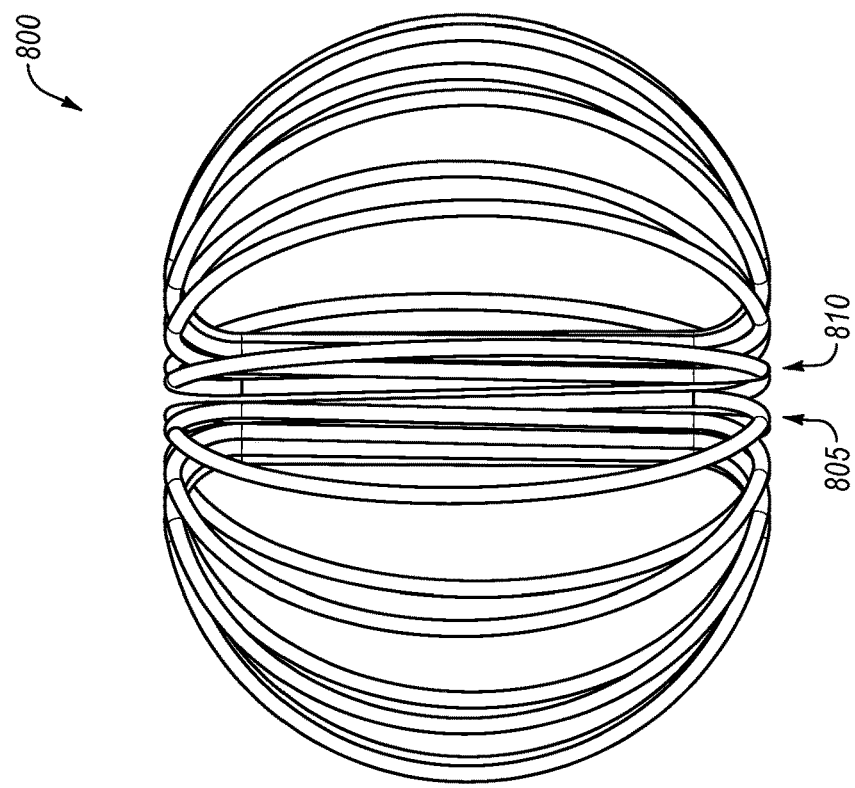
FIG. 8C illustrates a side view of the agitator of FIG. 8A in accordance with some embodiments.
Figure 8B:
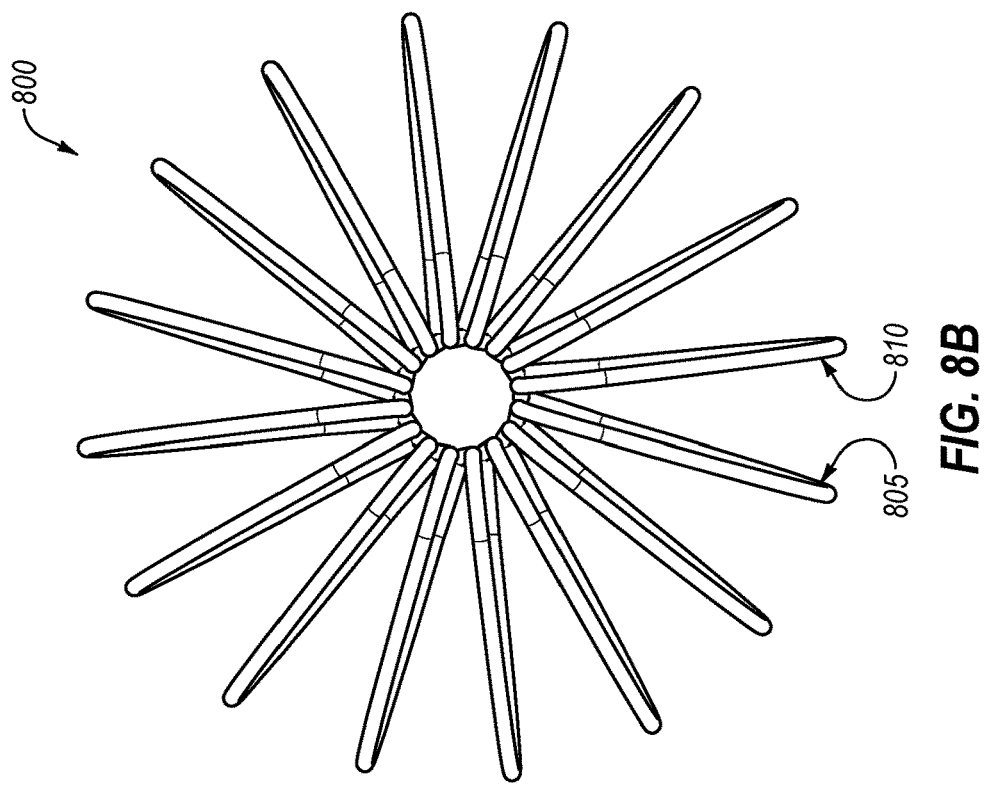
FIG. 8B illustrates a top view of the agitator of FIG. 8A in accordance with some embodiments.
Figure 8F:
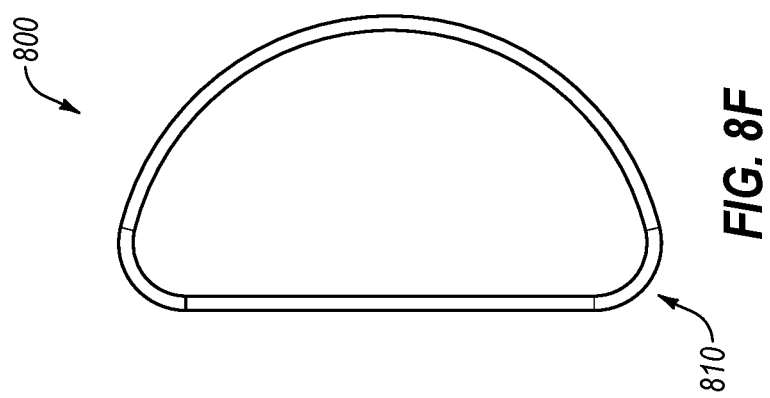
FIG. 8F illustrates a side view of the agitator of FIG. 8D in accordance with some embodiments.
Figure 8E:
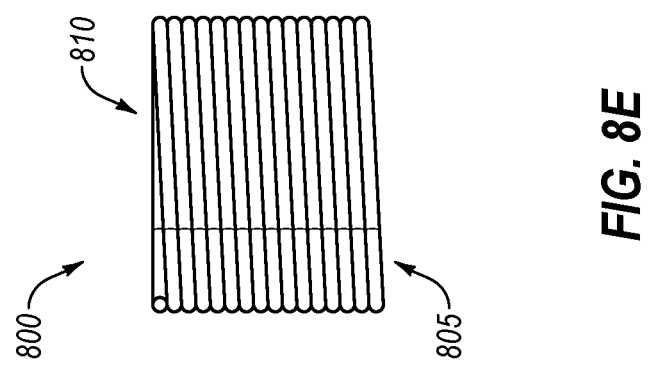
FIG. 8E illustrates a top view of the agitator of FIG. 8D in accordance with some embodiments.
Figure 8D:
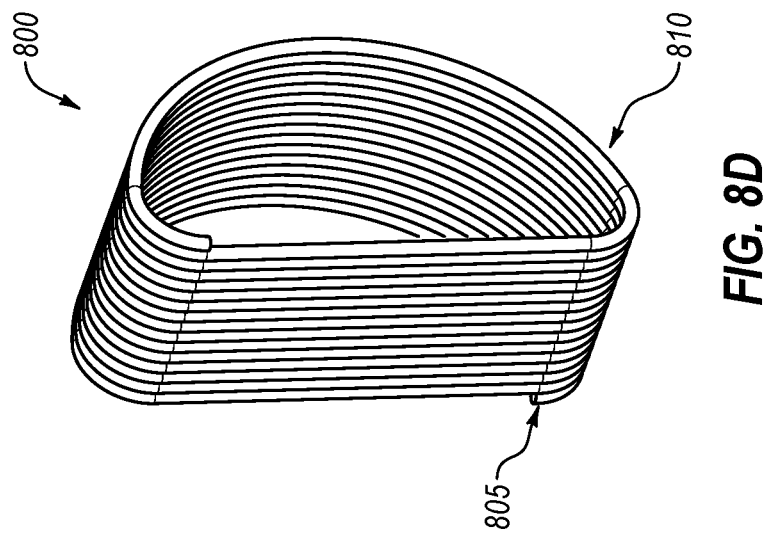
FIG. 8D illustrates an upper perspective view of the agitator of FIG. 8A in a compressed configuration in accordance with some embodiments.

FIG. 8A illustrates an upper perspective view of another example agitator 800 in an expanded configuration in accordance with some embodiments. FIG. 8B illustrates a top view of the agitator 800 of FIG. 8A in accordance with some embodiments. FIG. 8C illustrates a side view of the agitator 800 of FIG. 8A in accordance with some embodiments. FIG. 8D illustrates an upper perspective view of the agitator 800 of FIG. 8A in a compressed configuration in accordance with some embodiments. FIG. 8E illustrates a top view of the agitator 800 of FIG. 8D in accordance with some embodiments. FIG. 8F illustrates a side view of the agitator 800 of FIG. 8D in accordance with some embodiments.

As illustrated, the agitator 800 of FIGS. 8A-8F may include a primary coil shape of a spheroid or toroid (e.g., FIG. 8A) and a secondary coil shape of a D (e.g. FIG. 8F). The agitator 800 may be similar in some respects to the agitator 500. For example, the agitator 800 may have ends 805, 810 that wrap or twist toward each other. In these example embodiments, the configuration of the one or more members may facilitate the agitator 800 being compressed. For example, the agitator of FIG. 8A may be compressed and/or expanded as described above with respect to the agitator 100 in FIG. 3. Additionally or alternatively, the agitator of FIGS. 8A-8C may be compressed by, e.g., stacking or squeezing the D-shaped coils together as in FIGS. 8D-8F. In the compressed configuration of FIGS. 8D-8F, all of the D-shaped coils may be next to each other with the ends 805, 810 spaced apart from each other and with all the other D-shaped coils in between as opposed to the ends 805, 810 generally being relatively near or next to each other in the expanded configuration of FIGS. 8A-8C. Compressing the agitator of FIGS. 8A-8C as just described to the compressed configuration may occur prior to inserting and/or during insertion of the agitator into a neck of a container such as the neck 305 of the container 310. Additionally or alternatively, the agitator 800 of FIGS. 8D-8F may undergo other compression. For example, the rounded sides opposite the flat sides of each D-shaped coil may be compressed (e.g., flattened or pushed inward towards the flat side of the wedged-shaped coil) prior to inserting and/or during insertion of the agitator into a neck of a container such as the neck 305 of the container 310.

As the agitator 800 of FIGS. 8D-8F advances past the neck 305, the agitator 800 may expand portion by portion (or by any other suitable manner as described above with respect to the agitator 100 of FIG. 3). For example, as the agitator 800 of FIGS. 8D-8F advances past the neck 305, the agitator 800 may expand into the expanded configuration in which any of the following may occur individually or in combination: the stacked D-shaped coils may expand apart, the rounded sides opposite the flat sides of each D-shaped coil may be decompressed (e.g., de-flattened or rebounded outward from the flat side of each D-shaped coil), etc.

Figure 9:
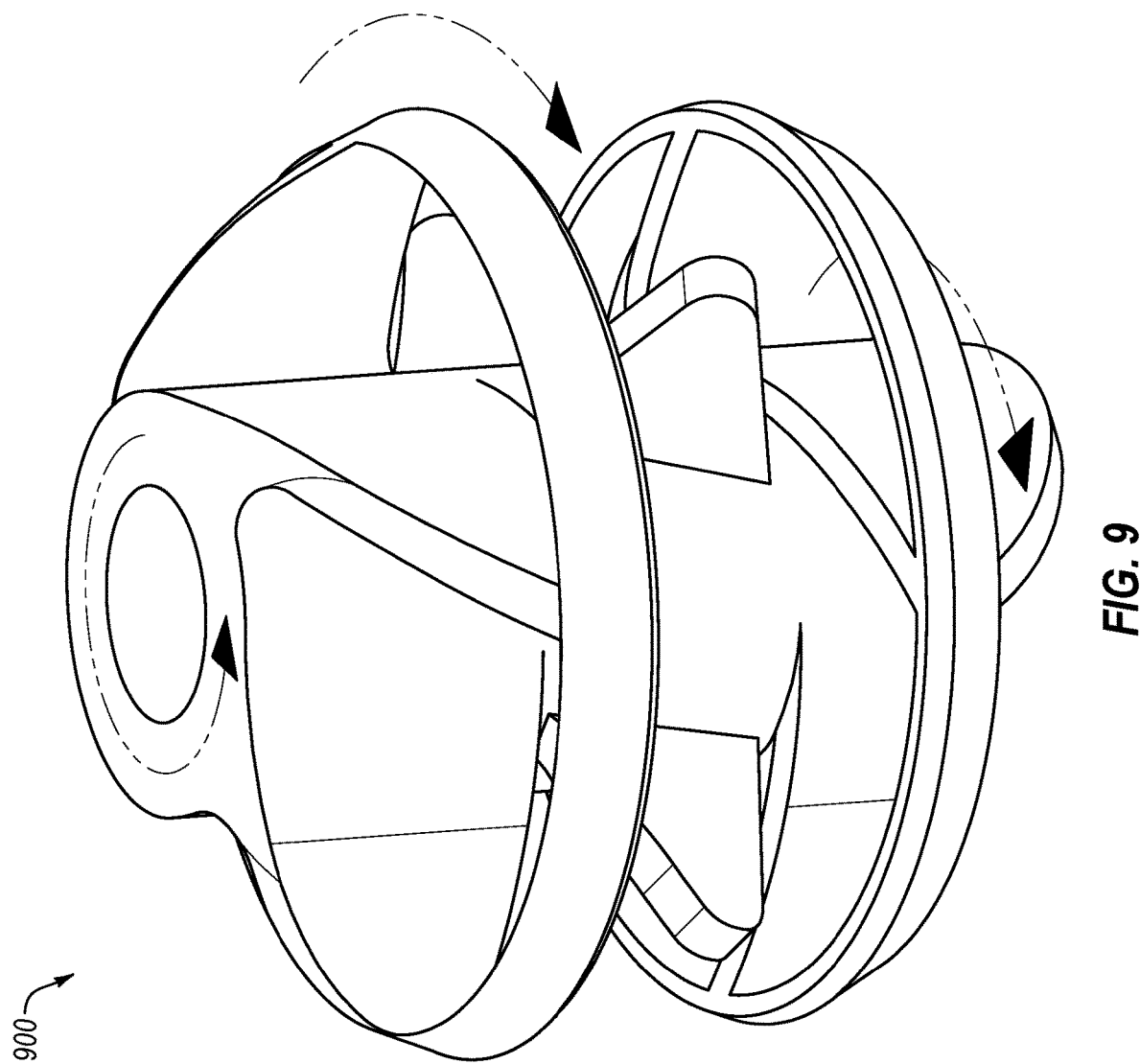
FIG. 9 illustrates an upper perspective view of another example agitator in accordance with some embodiments.

FIG. 9 illustrates an upper perspective view of another example agitator 900 in accordance with some embodiments. The agitator 900 of FIG. 9 may be configured to rotate at various portions relative to other portions (e.g., see example arrows as indicated in FIG. 9) to go from an expanded configuration as illustrated in FIG. 9 to a compressed configuration and vice versa. The agitator 900 may include a central core that may be weighted. The agitator 900 may also include one or more members arranged as a spoke, a fin, a spiral, a slot, a webbing, etc. In these or other embodiments, some of or each of the one or more members may be configured to buckle or deform, for example, to compress to the compressed configuration. For example, the agitator 900 of FIG. 9 may be compressed and/or expanded as described above with respect to the agitator 100 in FIG. 3. Additionally or alternatively, the agitator 900 of FIG. 9 may be compressed while inserted into the neck 305, e.g., by twisting the central core relative to the one or more members and/or the neck 305. For example, as the agitator 900 advances through the neck 305, the one or more members may compress portion by portion into the compressed configuration in which any of the following may occur individually or in combination: the one or more members may be bent or buckled inward towards the central core, the one or more members may flatten, the one or more members may bend, collapse, and/or rotate in an opposite direction than the central core is twisted, the one or more members may wrap around or hug the central core, etc.

As the agitator 900 of FIG. 9 advances past the neck 305, the agitator 900 may expand portion by portion (or by any other suitable manner as described above with respect to the agitator 100 of FIG. 3). For example, as the agitator 900 of FIG. 9 advances past the neck 305, the agitator 900 may expand into the expanded configuration in which any of the following may occur individually or in combination: the one or more members may unbend or rebound outward away from the central core, the one or more members may de-flatten, the one or more members may unbend, expand, and/or rotate back in an opposite direction (the original twisting direction of the central core), the one or more members may unwrap from around the central core, etc.

Figure 10:
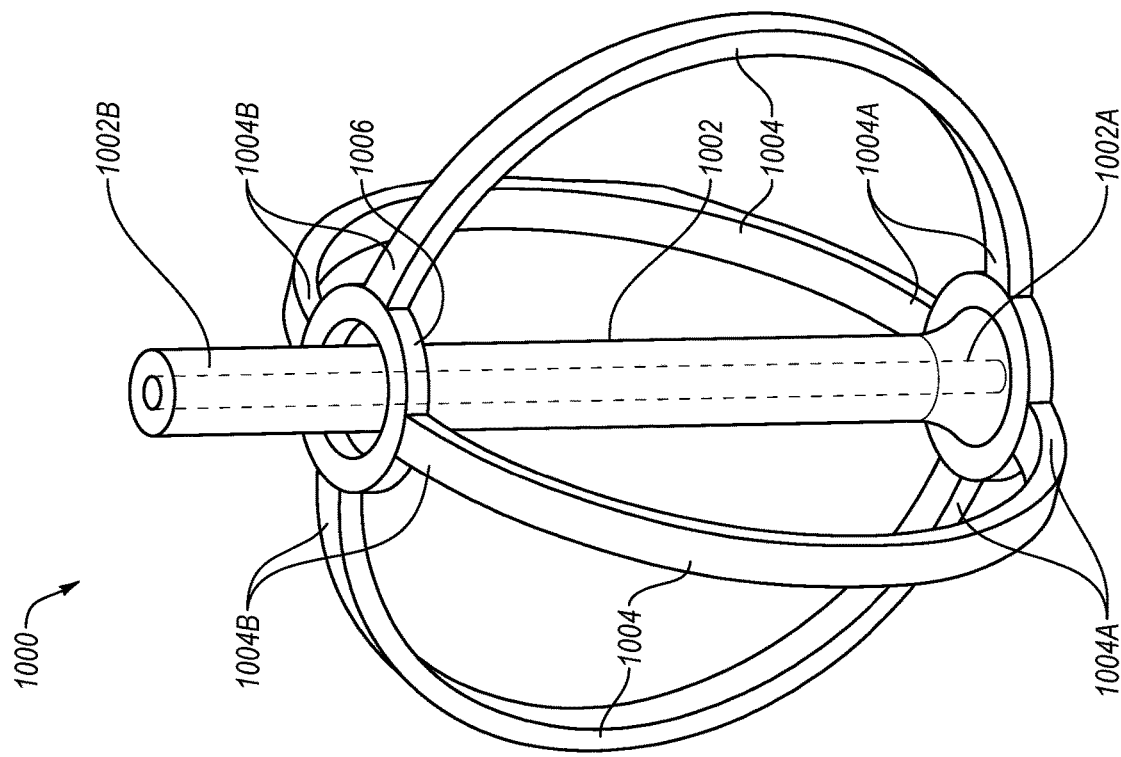
FIG. 10 illustrates an upper perspective view of another example agitator in accordance with some embodiments.

FIG. 10 illustrates an upper perspective view of another example agitator 1000 in accordance with some embodiments. As illustrated, the agitator 1000 of FIG. 10 may include a weighted shaft 1002. At a first end 1002A of the weighted shaft 1002, one or more members 1004 may each have a first end 1004A fixed to the first end 1002A of the shaft 1002. A second end 1004B of each of the one or more members 1004 may be slidably coupled to the weighted shaft 1002, e.g., at or near a second end 1002B of the weighted shaft 1002. The one or more members 1004 may be slidably coupled to the weighted shaft 1002 by a ring 1006. The weighted shaft 1002 may pass through the ring 1006. The second end 1004B of each of the one or more members 1004 may be attached to the ring 1006 such that the second ends 1004B slide up and down the weighted shaft 1002. In this manner, the one or more members 1004 may slide between the first end 1002A and the second end 1002B of the shaft 1002.

In this example embodiment, the agitator 1000 may be compressed and/or expanded as described above with respect to the agitator 100 in FIG. 3. Additionally or alternatively, the agitator 1000 of FIG. 10 may be compressed by at least partially straightening out the one or more members 1004 of the agitator 1000 (e.g., causing the respective second ends 1004B of the one or more members 1004 to slide up the weighted shaft 1002 towards the second end 1002B and away from the first end 1002A). In this example embodiment, the agitator 1000 may be prepared to be inserted into a neck such as the neck 305. The agitator 1000 may be inserted into the neck 305 with the first end 1002A of the weighted shaft 1002 proceeding first. As the agitator 1000 advances through the neck 305, the one or more members 1004 of the agitator 1000 may, additionally or alternatively to the straightening compression, be compressed portion by portion into the compressed configuration in which any of the following may occur individually or in combination: the one or more members 1004 may be more tensioned, the respective second ends 1004B of the one more members 1004 may slide towards the second end 1002B of the weighted shaft 1002, the one or more members 1004 may become less bowed or rounded (e.g., straightened), one or more members 1004 of the agitator may stiffen, etc.

As the agitator 1000 of FIG. 10 advances past the neck 305, the agitator 1000 may expand portion by portion (or by any other suitable manner as described above with respect to the agitator 100 of FIG. 3). For example, as the agitator 1000 advances past the neck 305, the agitator 1000 may expand into the expanded configuration in which any of the following may occur individually or in combination: the one or more members 1004 may be less tensioned, the respective second ends 1004B of the one more members 1004 may slide away from the second end 1002B of the shaft 1002 towards the first end 1002A of the shaft 1002, the one or more members 1004 may become more bowed or rounded (e.g., less straight), one or more members 1004 of the agitator may become less stiff, etc.

Figure 11:
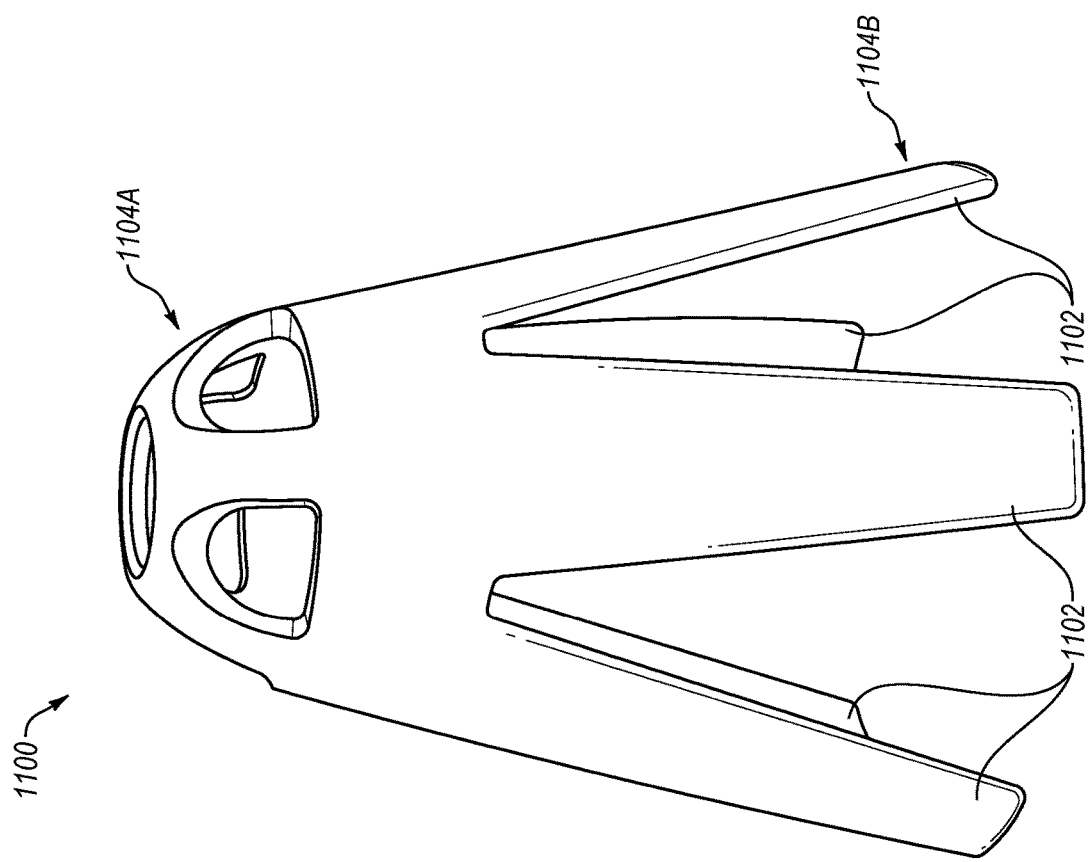
FIG. 11 illustrates an upper perspective view of another example agitator in accordance with some embodiments.

FIG. 11 illustrates an upper perspective view of another example agitator 1100 in accordance with some embodiments. As illustrated, the agitator 1100 may include one or more members 1102 that form a conical or frustoconical structure. A first end 1104A of the agitator 1100 may be a smaller-diameter end of the agitator 1100 (e.g., the round bottom of the birdie). A second end 1104B of the agitator 1100 may be a larger-diameter end of the agitator 1100, which may be open. Various apertures and slots may be defined by the one or more members 1102 between the first end 1104A and the second end 1104B of the agitator 1100 in FIG. 11.

In this example embodiment, the agitator 1100 of FIG. 11 may be compressed and/or expanded as described above with respect to the agitator 100 in FIG. 3. Additionally or alternatively, the agitator 1100 may be compressed by bending, flexing, or deforming the one or more members 1102 of the agitator 1100 (e.g., causing the one or more members 1102 to push inward towards each other). In this example embodiment, the agitator 1100 may be prepared to be inserted into a neck such as the neck 305. The agitator 1100 may be inserted into the neck 305 with the first end 1104A of the agitator 1100 proceeding first. As the agitator 1100 advances through the neck 305, the one or more members 1102 of the agitator 1100 may, additionally or alternatively to the compression described above, be compressed portion by portion into the compressed configuration in which any of the following may occur individually or in combination: portions of the one or more members 1102 may become squeezed closer together, an outer surface of the one or more members 1102 may be tensioned, a bending moment may be applied to the one or more members 1102 in which the bending force may be the normal force applied by the neck 305 and the moment arm measured from a point of the normal force to a base portion of the one or more members 1102 at the first end 1104A of the agitator 1100, the one or more members 1102 may become more stiff, etc.

As the agitator 1100 advances past the neck 305, the agitator 1100 may expand portion by portion (or by any other suitable manner as described above with respect to the agitator 100 of FIG. 3). For example, as the agitator 1100 of FIG. 11 advances past the neck 305, the agitator 1100 may expand into the expanded configuration in which any of the following may occur individually or in combination: the one or more members 1102 may become unsqueezed, an outer surface of the one or more members may 1102 be less tensioned, the bending moment applied to the one or more members 1102 may change or be removed, the one or more members 1102 may become less stiff, etc.

Figure 12:
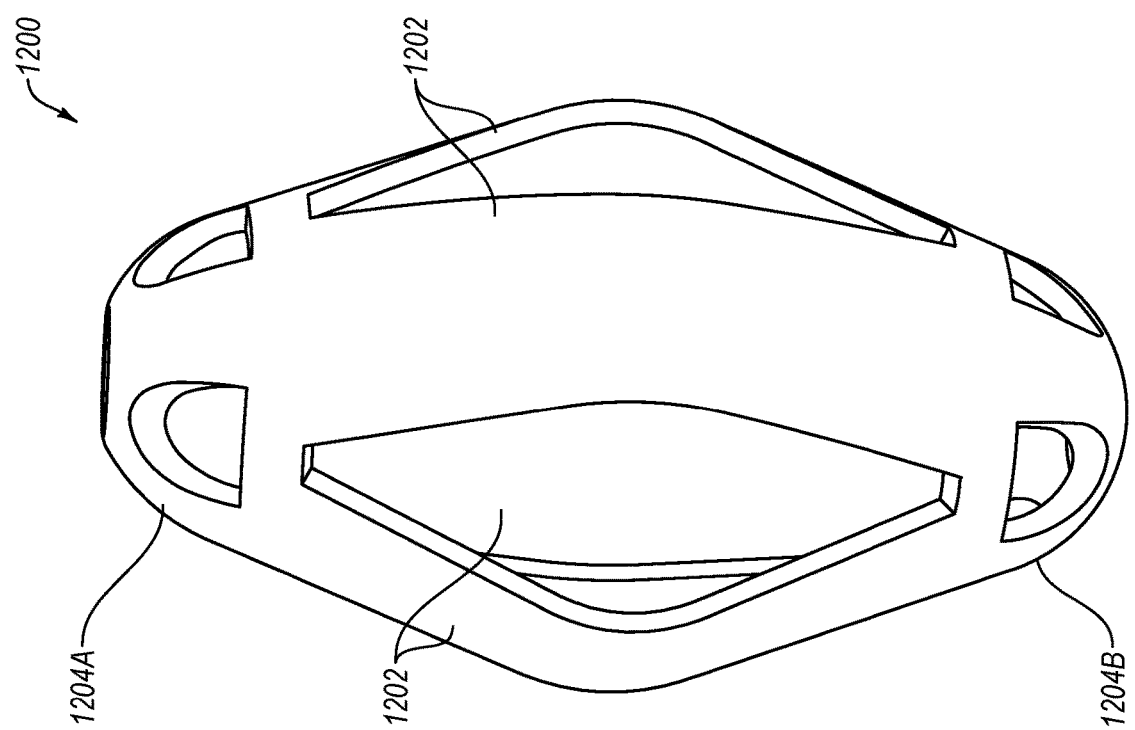
FIG. 12 illustrates an upper perspective view of another example agitator in accordance with some embodiments.

FIG. 12 illustrates an upper perspective view of another example agitator 1200 in accordance with some embodiments.

Figure 13:
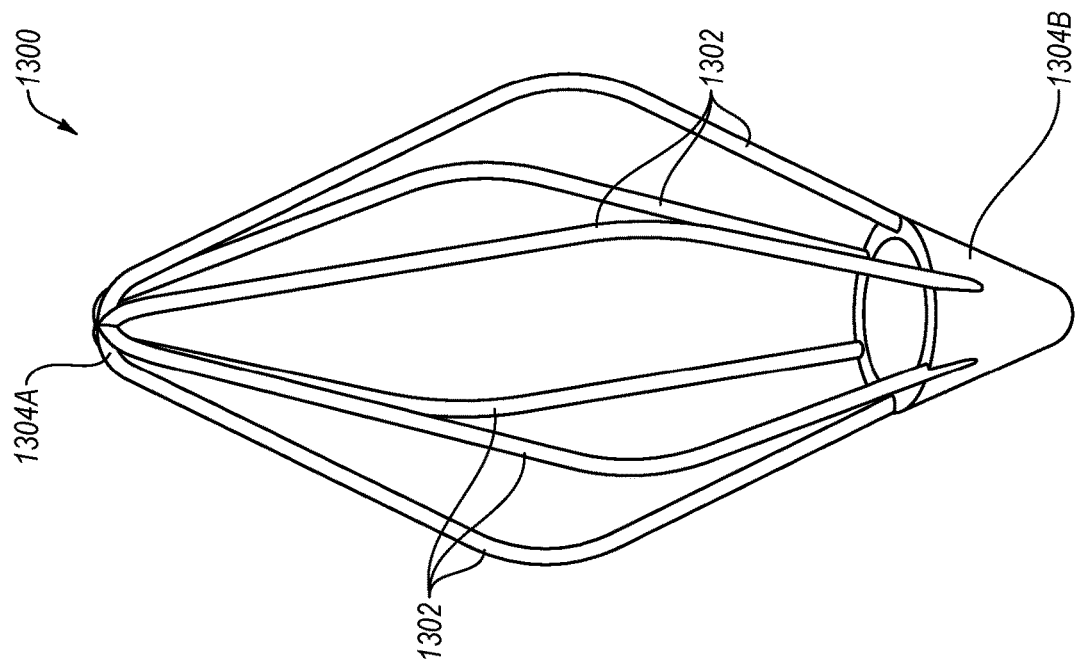
FIG. 13 illustrates an upper perspective view of another example agitator in accordance with some embodiments.

FIG. 13 illustrates an upper perspective view of another example agitator 1300 in accordance with some embodiments.

Each of the agitators 1200, 1300 of FIGS. 12-13 may generally comprise one or more members 1202, 1302 that collectively define a polyhedral structure. The agitators 1200, 1300 of FIGS. 12-13 may each include a first end 1204A, 1304A and a second end 1204B, 1304B that are the same or similar. For example, each of the agitators 1200, 1300 may be symmetrical. The one or more members 1202, 1302 may also, in the expanded configuration, bulge outwards at a central portion of the agitator 1200, 1300 between the first end 1204A, 1304A and the second end 1204B, 1304B of the agitator 1200, 1300. Various apertures and slots may be defined by the one or more members 1202, 1302 between the first end 1204A, 1304A and the second end 1204B, 1304B of each of the agitators 1200, 1300 of FIGS. 12-13.

In these example embodiments, the agitators 1200, 1300 may be compressed and/or expanded as described above with respect to the agitator 100 in FIG. 3. Additionally or alternatively, the agitator 1200, 1300 may be compressed by bending, flexing, or deforming the one or more members 1202, 1302 of the agitator 1200, 1300 (e.g., causing the one or more members 1202, 1302 to push inward towards each other). In this example embodiment, the agitator 1200, 1300 may be prepared to be inserted into a neck such as the neck 305. The agitator 1200, 1300 may be inserted into the neck 305 with either the first end 1204A, 1304A or the second end 1204B, 1304B of the agitator 1200, 1300 proceeding first. As the agitator 1200, 1300 advances through the neck 305, the one or more members 1202, 1302 of the agitator 1200, 1300 may, additionally or alternatively to the compression described above, be compressed portion by portion into the compressed configuration in which any of the following may occur individually or in combination: the one or more members 1202, 1302 bent at the central portion of the agitator 1200, 1300 may become straighter, the spacing between the one or more members 1202, 1302 may decrease (e.g., the spacing between the one or more members 1202, 1302 at the central portion of the agitator 1200, 1300 may decrease), the height of the agitator 1200, 1300 between the first end 1204A, 1304A and the second end 1204B, 1304B may increase, the one or more members 1202, 1302 may buckle inwards toward each other, etc.

As the agitator 1200, 1300 advances past the neck 305, the agitator 1200, 1300 may expand portion by portion (or by any other suitable manner as described above with respect to the agitator 100 of FIG. 3). For example, as the agitator 1200, 1300 advances past the neck 305, the agitator 1200, 1300 may expand into the expanded configuration in which any of the following may occur individually or in combination: the one or more members 1202, 1302 straightened at the central portion of the agitator 1200, 1300 may return to the bent configuration, the spacing between the one or more members 1202, 1302 may increase (e.g., the spacing between the one or more members 1202, 1302 at the central portion of the agitator 1200, 1300 may increase), the height of the agitator 1200, 1300 between the first end 1204A, 1304A and the second end 1204B, 1304B may decrease, the one or more members 1202, 1302 may push outward away from each other, etc.

Figure 14B:
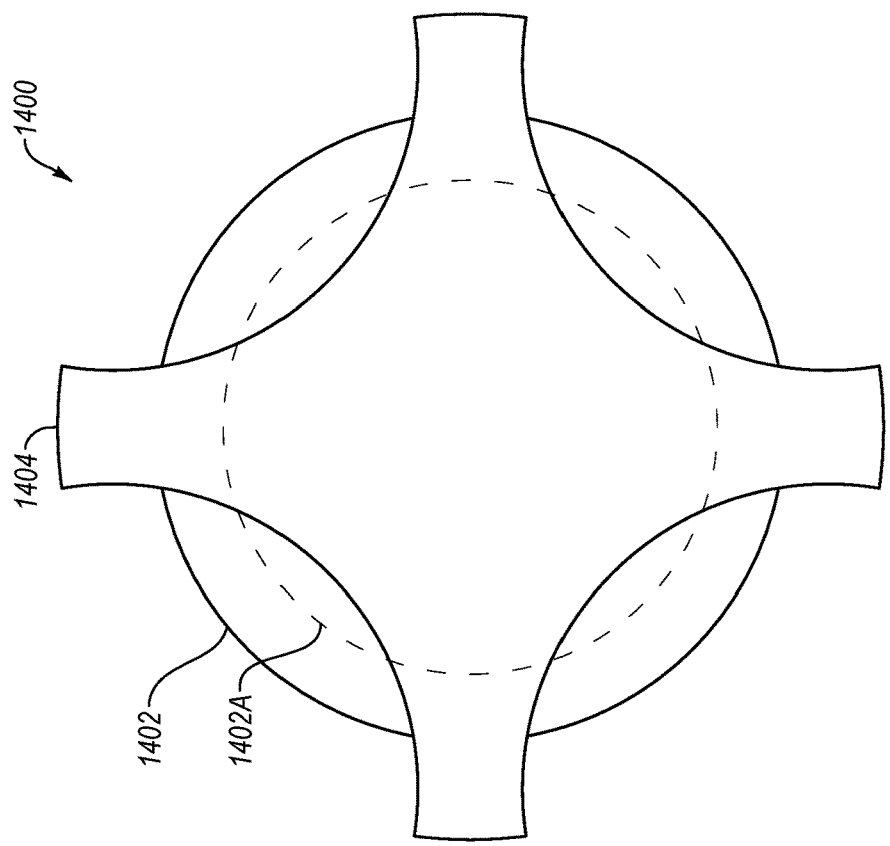
FIG. 14B illustrates a side view of the agitator of FIG. 14A in accordance with some embodiments.
Figure 14A:
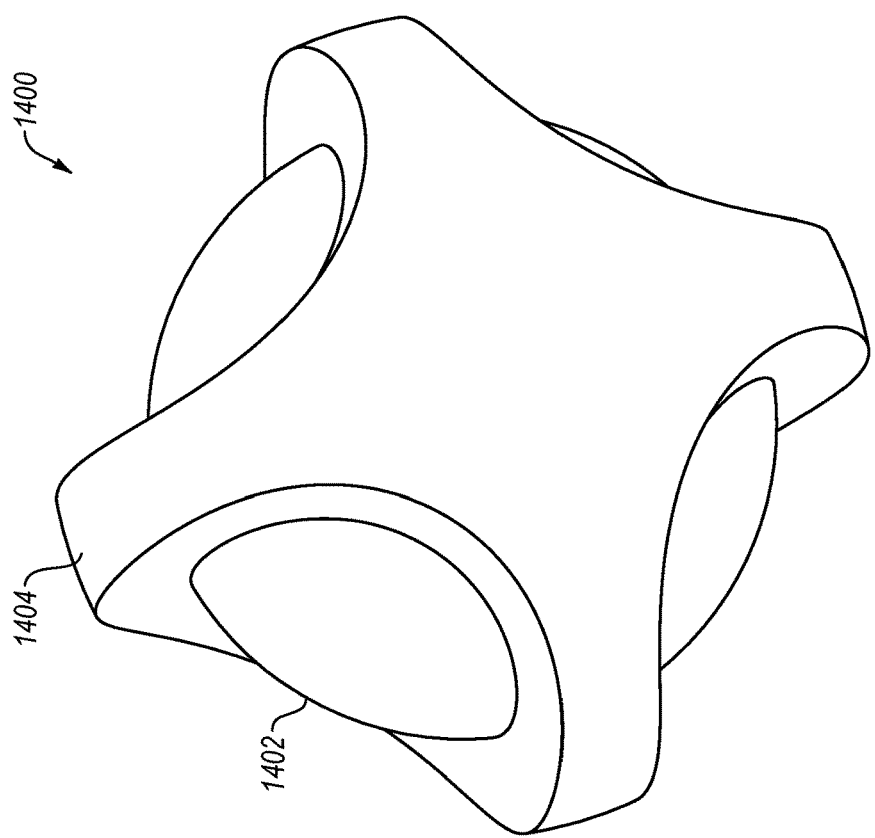
FIG. 14A illustrates an upper perspective view of another example agitator in accordance with some embodiments.

FIG. 14A illustrates an upper perspective view of another example agitator 1400 in accordance with some embodiments. FIG. 14B illustrates a side view of the agitator 1400 of FIG. 14A in accordance with some embodiments. As illustrated, the agitator 1400 may include a core 1402 that may be weighted (e.g., having a weight or density greater than that of the surrounding material). For example, the core 1402 may include a weight, an example outline of which is depicted in FIG. 14B at 1402A. The weight 1402A may be round. The weight 1402A may be overmolded with another material. In these or other embodiments, one or more members 1404 may partially (or otherwise) cover or extend around the core 1402. For example, the one or more members 1404 may protrude from the core 1402 and follow one or more surface contours of the core 1402. In some embodiments, the one or more members 1404 may include a compressible material. Additionally or alternatively, the weight 1402A may include a compressible material.

In these example embodiments, the agitator 1400 may be compressed and/or expanded as described above with respect to the agitator 100 in FIG. 3. Additionally or alternatively, the agitator 1400 may be compressed by pressing or deforming the one or more members 1404 of the agitator 1400 (e.g., causing the one or more members 1404 to compact, flatten, or move). In this example embodiment, the agitator 140 may be prepared to be inserted into a neck such as the neck 305. The agitator 1400 may be inserted into the neck 305 in any orientation. As the agitator 1400 advances through the neck 305, the one or more members 1404 of the agitator 1400 may, additionally or alternatively to the compression described above, be compressed portion by portion into the compressed configuration in which any of the following may occur individually or in combination: the one or more members 1404 may be compacted or flattened, the one or more members 1404 may compress at one portion (e.g., a portion being compressed by the normal force of the neck 305) and swell at another portion (e.g., a portion not being compressed by the normal force of the neck 305), the one or more members 1404 may bend or deflect, etc.

As the agitator 1400 advances past the neck 305, the agitator 1400 may expand portion by portion (or by any other suitable manner as described above with respect to the agitator 100 of FIG. 3). For example, as the agitator 1400 advances past the neck 305, the agitator 1400 may expand into the expanded configuration in which any of the following may occur individually or in combination: the one or more members 1404 may be de-compacted or de-flattened, the one or more members 1404 may decompress at one portion (e.g., the portion formerly compressed by the normal force of the neck 305) and/or compress at another portion (e.g., the portion formerly not being compressed by the normal force of the neck 305), the one or more members 1404 may return from bending/deflection, etc.

Figure 15A:
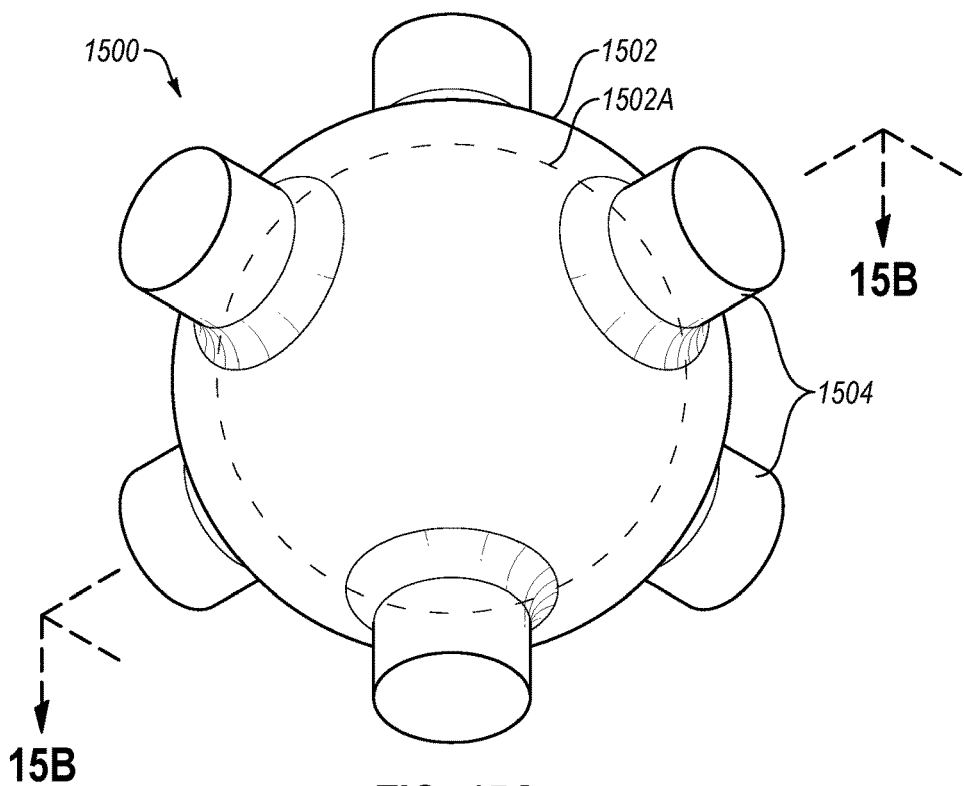
FIG. 15A illustrates a lower perspective view of another example agitator in accordance with some embodiments.
Figure 15B:
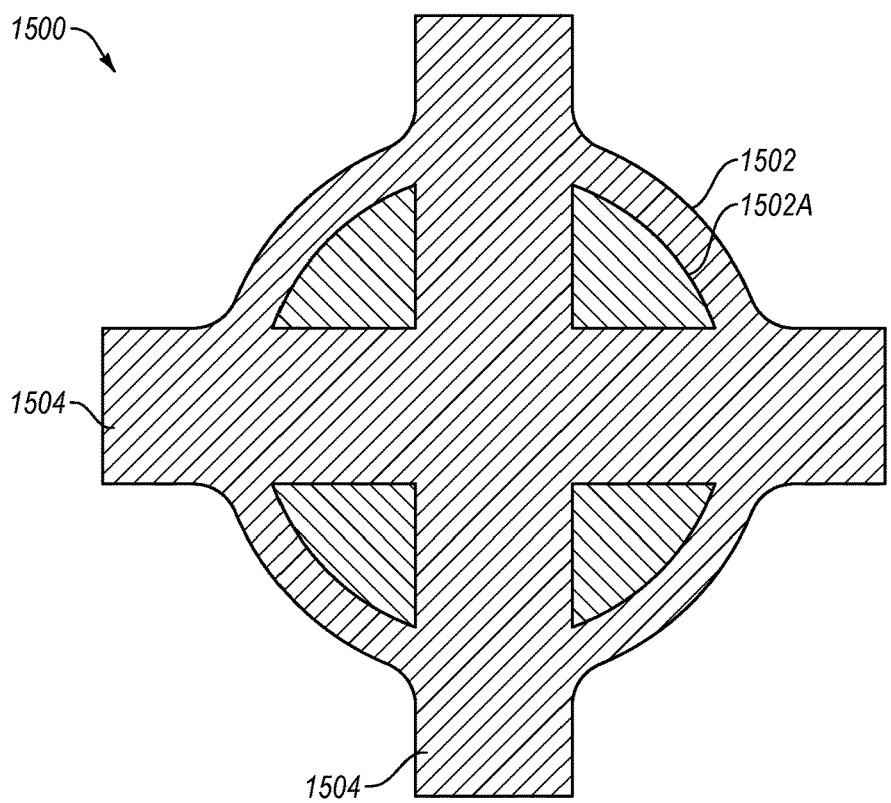
FIG. 15B illustrates a cross-sectional top view of the agitator of FIG. 15A in accordance with some embodiments.

FIG. 15A illustrates a lower perspective view of another example agitator 1500 in accordance with some embodiments. FIG. 15B illustrates a cross-sectional view of the agitator 1500 of FIG. 15A in accordance with some embodiments. As illustrated, the agitator 1500 may include a core 1502 that may be weighted. For example, the core 1502 may include a weight 1502A. The weight 1502A may be round. The weight 1502A may be overmolded with another material. Alternatively or additionally, the weight 1502A may have through holes formed therein, such as three mutually orthogonal through holes in the illustrated embodiment. The material that covers the weight 1502A may also fill the through holes and extend outward therefrom as one or more members 1504. In these or other embodiments, the one or more members 1504 may partially (or otherwise) cover or extend from the core 1502. For example, the one or more members 1504 may protrude from the core 1502 and extend outward away from the core 1502. In some embodiments, the one or more members 1504 may include a compressible material. Additionally or alternatively, the core 1502 may include a compressible material.

In this example embodiment, the agitator 1500 may be compressed and/or expanded as described above with respect to the agitator 100 in FIG. 3. Additionally or alternatively, the agitator 1500 may be compressed by pressing or deforming the one or more members 1504 of the agitator 1500 (e.g., causing the one or more members 1504 to compact, flatten, or move). In this example embodiment, the agitator 1500 may be prepared to be inserted into a neck such as the neck 305. The agitator 1500 may be inserted into the neck 305 in any orientation. As the agitator 1500 advances through the neck 305, the one or more members 1504 of the agitator 1500 may, additionally or alternatively to the compression described above, be compressed portion by portion into a compressed configuration in which any of the following may occur individually or in combination: the one or more members 1504 may be compacted or flattened, the one or more members 1504 may compress at one portion (e.g., a portion being compressed by the normal force of the neck 305) and/or swell at another portion (e.g., a portion not being compressed by the normal force of the neck 305), the one or more members 1504 may bend or deflect, etc.

As the agitator 1500 advances past the neck 305, the agitator 1500 may expand portion by portion (or by any other suitable manner as described above with respect to the agitator 100 of FIG. 3). For example, as the agitator 1500 advances past the neck 305, the agitator 1500 may expand into the expanded configuration in which any of the following may occur individually or in combination: the one or more members 1504 may be de-compacted or de-flattened, the one or more members 1504 may decompress at one portion (e.g., the portion formerly compressed by the normal force of the neck 305) and/or compress at another portion (e.g., the portion formerly not being compressed by the normal force of the neck 305), the one or more members 1504 may return from bending/deflection, etc.

Figure 16:
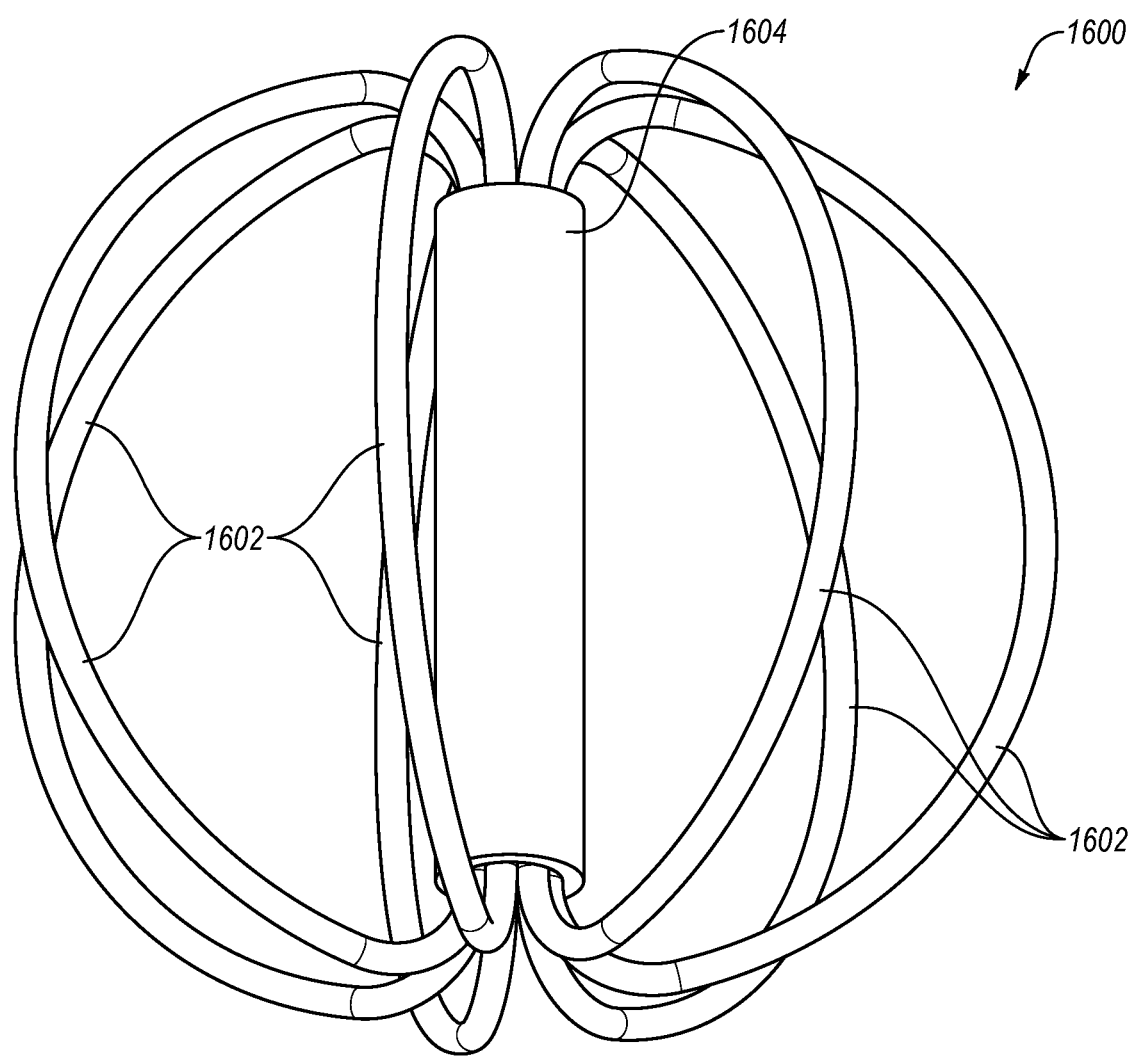
FIG. 16 illustrates a lower perspective view of another example agitator in accordance with some embodiments.

FIG. 16 illustrates a lower perspective view of an example agitator 1600 in accordance with some embodiments. As illustrated, the agitator 1600 of FIG. 16 may include one or more members 1602 that are the same as or similar to the one or more members of FIGS. 8A-8F. For example, the one or more members 1602 may include one or more D-shaped turns of a coil formed from a single piece of wire or may include discrete D-shaped loops coupled together along flat or straight sides of the D-shaped loops. Additionally or alternatively, the agitator 1600 of FIG. 16 may include a weight 1604 coupled thereto. For example, the flat side of the members 1602, whether implemented as D-shaped turns formed from a single piece of wire or as discrete D-shaped loops, may pass through the weight 1604. The agitator 1600 of FIG. 16 may compress to the compressed configuration and/or expand to the expanded configuration as described above with respect to FIGS. 3-4 and/or FIGS. 8A-8F and with respect to a container such as the container 310 and/or in some other manner.

Figure 17A:
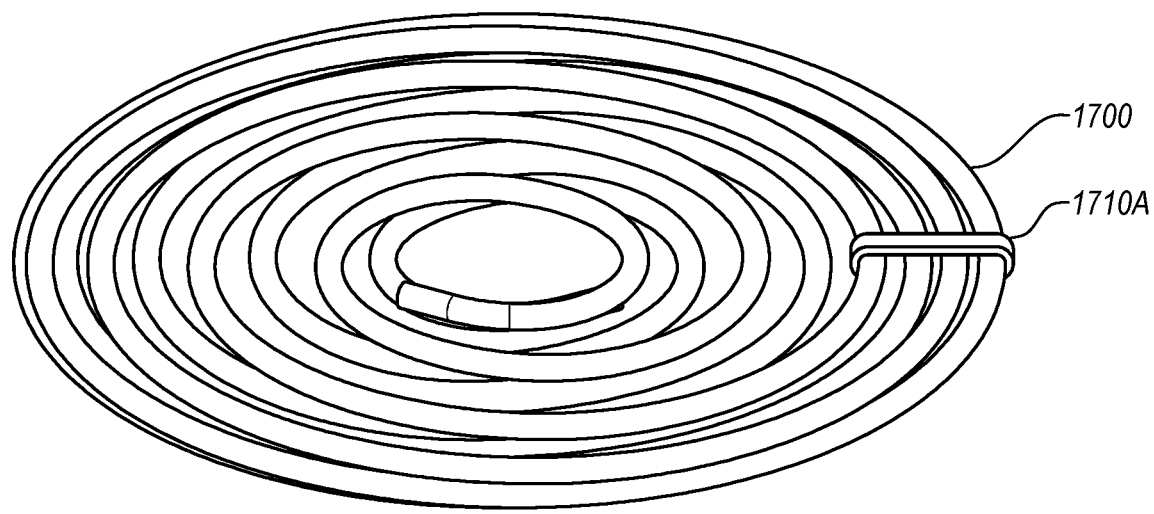
FIG. 17A illustrates an upper perspective view of another example agitator in a compressed configuration with an example retainer in accordance with some embodiments.
Figure 17B:
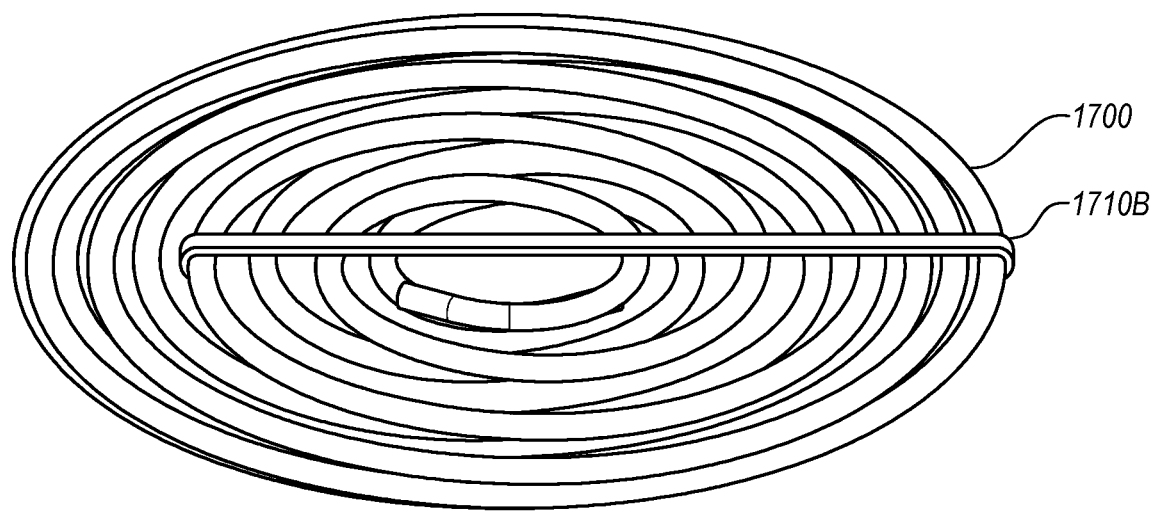
FIG. 17B illustrates the agitator of FIG. 17A with another example retainer in accordance with some embodiments.
Figure 17C:
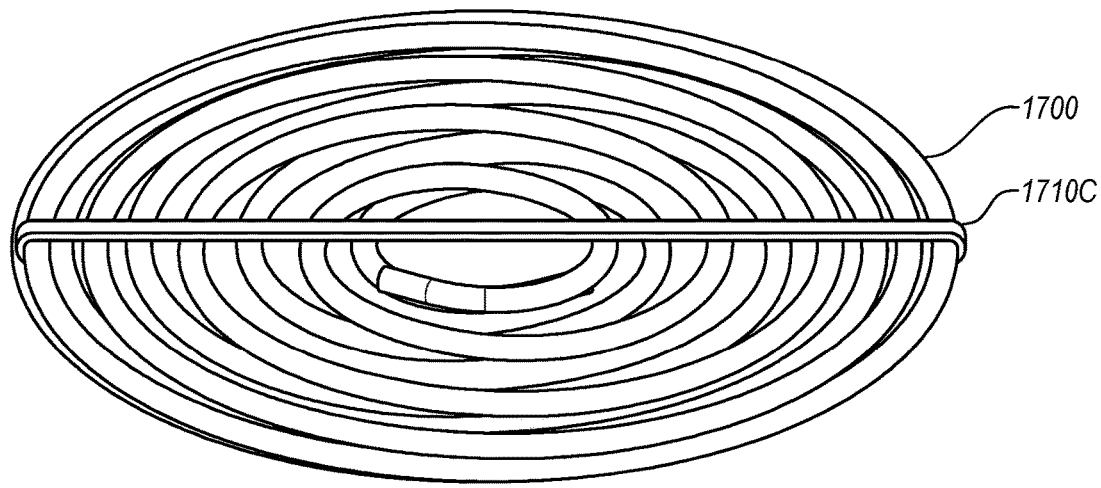
FIG. 17C illustrates the agitator of FIG. 17A with another example retainer in accordance with some embodiments.
Figure 17D:
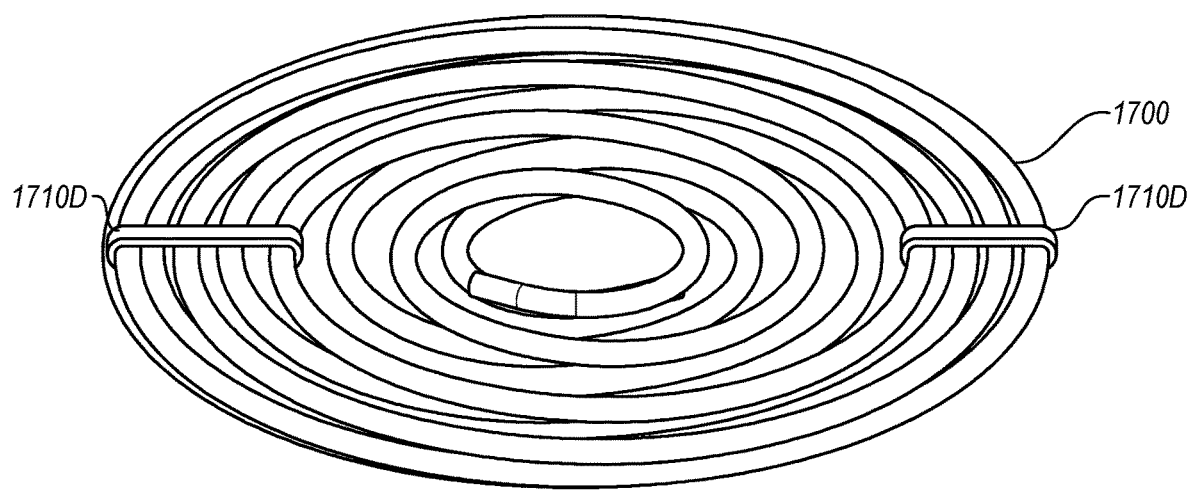
FIG. 17D illustrates the agitator of FIG. 17A with another example retainer in accordance with some embodiments.

FIG. 17A illustrates an upper perspective view of another example agitator 1700 in a compressed configuration with an example retainer 1710A in accordance with some embodiments. FIG. 17B illustrates the agitator 1700 of FIG. 17A with another example retainer 1710B in accordance with some embodiments. FIG. 17C illustrates the agitator 1700 of FIG. 17A with another example retainer 1710C in accordance with some embodiments. FIG. 17D illustrates the agitator 1700 of FIG. 17A with multiple example retainers 1710D in accordance with some embodiments.

In some embodiments, the agitator 1700 may be the same as or similar to the agitator 100 of FIGS. 1-4. Additionally or alternatively, the agitator 1700 may be the same as or similar to any of the agitator embodiments described herein. Thus, in some embodiments, one or more of the retainers 1710A-1710D (collectively "retainers 1710" and/or generically "retainer 1710") as disclosed herein may be tailored to or otherwise made suitable for any of the agitator embodiments described herein without departing from the scope of the present disclosure. Thus, the retainer 1710 may be merely one example structure to maintain the agitator 1700 (or any agitator described herein) in its compressed configuration. For example, maintaining the agitator 1700 in the compressed configuration may include maintaining the agitator 1700 in the compressed configuration using shrinkwrap (or other suitable tightly packaged wrapping/packaging), adhesives, soluble/non-soluble constrictors (e.g., bands, clips, strings, pins, cords, hooks, loops, breakable welds, dissolvable materials, other suitable items used in compression purposes), etc.

In these or other embodiments, maintaining the agitator 1700 in the compressed configuration may include attaching the retainer 1710 to help inhibit expansion of the agitator 1700. For example, the retainer 1710 may attach to one or more members of the agitator 1700. The one or more members of the agitator 1700 may include one or more turns of a coil that forms the agitator 1700. In FIG. 17A, the retainer 1710A is attached to fewer than half of the one or more members of the agitator 1700 that are generally visible at a forefront of FIG. 17A. In FIG. 17B, the retainer 1710B is attached to more than half of the one or more members of the agitator 1700 that are generally visible at a forefront of FIG. 17B. In FIG. 17C, the retainer 1710C is attached to all of the one or more members of the agitator 1700 that are generally visible at a forefront of FIG. 17C. In FIG. 17D, there are multiple retainers 1710D maintaining the agitator 1700 in a compressed configuration in accordance with some embodiments. Any number of retainers 1710 may be used to hold the agitator 1700 in the compressed configuration.

The retainer 1710 may be formed from any material. In at least one embodiment, the retainer 1710 may be formed from a same material as the agitator 1700. In at least one embodiment, the retainer 1710 may be formed from a water-soluble material.

Figure 17E:
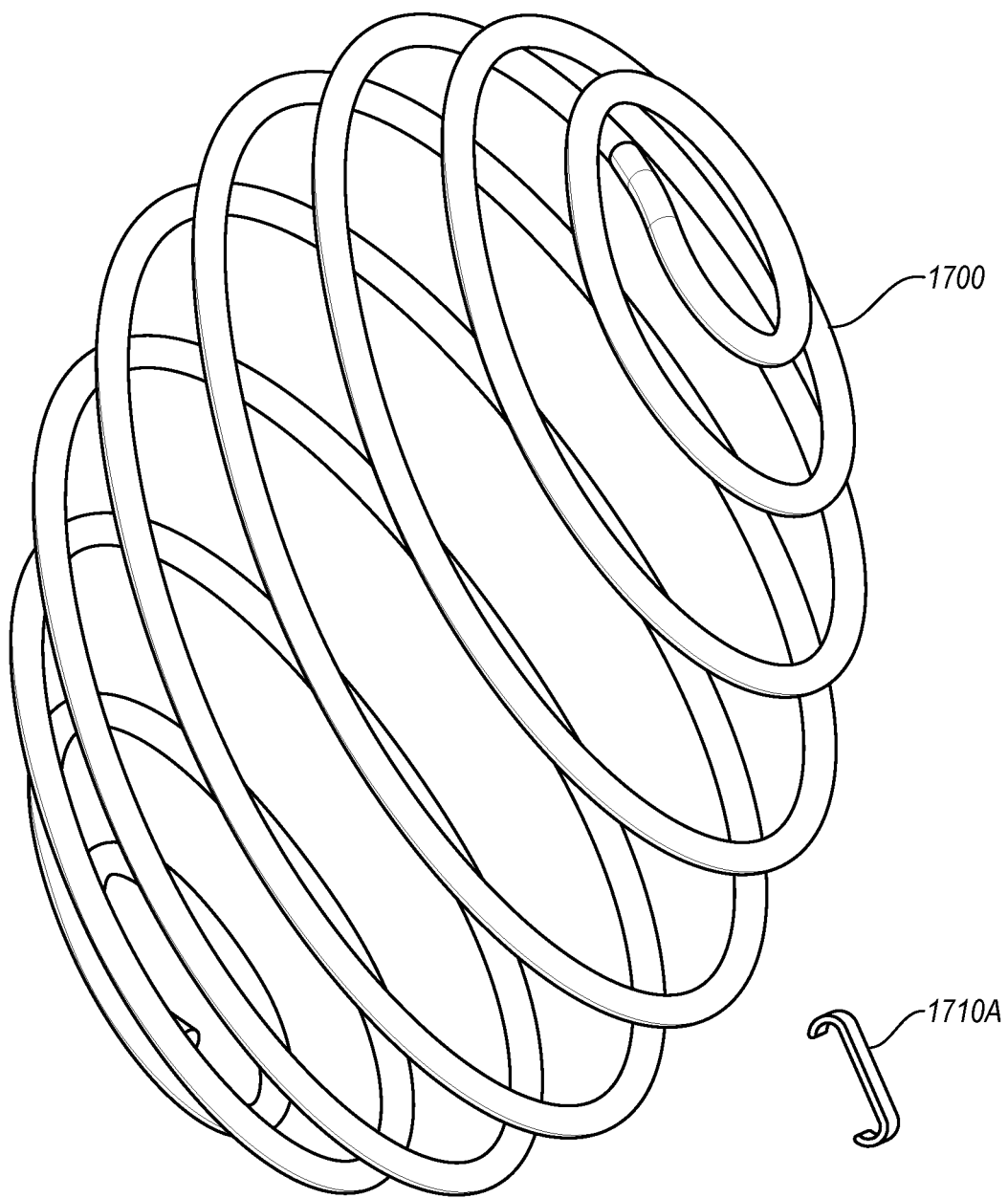
FIG. 17E illustrates the agitator of FIG. 17A in an expanded configuration after removal of the retainer of FIG. 17A from the agitator in accordance with some embodiments.

FIG. 17E illustrates the agitator 1700 in an expanded configuration with the retainer 1710A in accordance with some embodiments. The retainer 1710A is illustrated detached from the agitator 1700 in FIG. 17E, illustrating that, at least in some embodiments, the retainer 1710 may be configured to at least partially detach from the agitator 1700. The at least partial detachment of the retainer 1710 from the agitator 1700 may cause the agitator 1700 to change from the compressed configuration to the expanded configuration. As described with respect to the agitator 100, and as applicable to one or more agitator embodiments described herein, the agitator 1700 may in the expanded configuration be too large to fit through the neck 305 of the container 310 in any orientation.

Figure 18A:
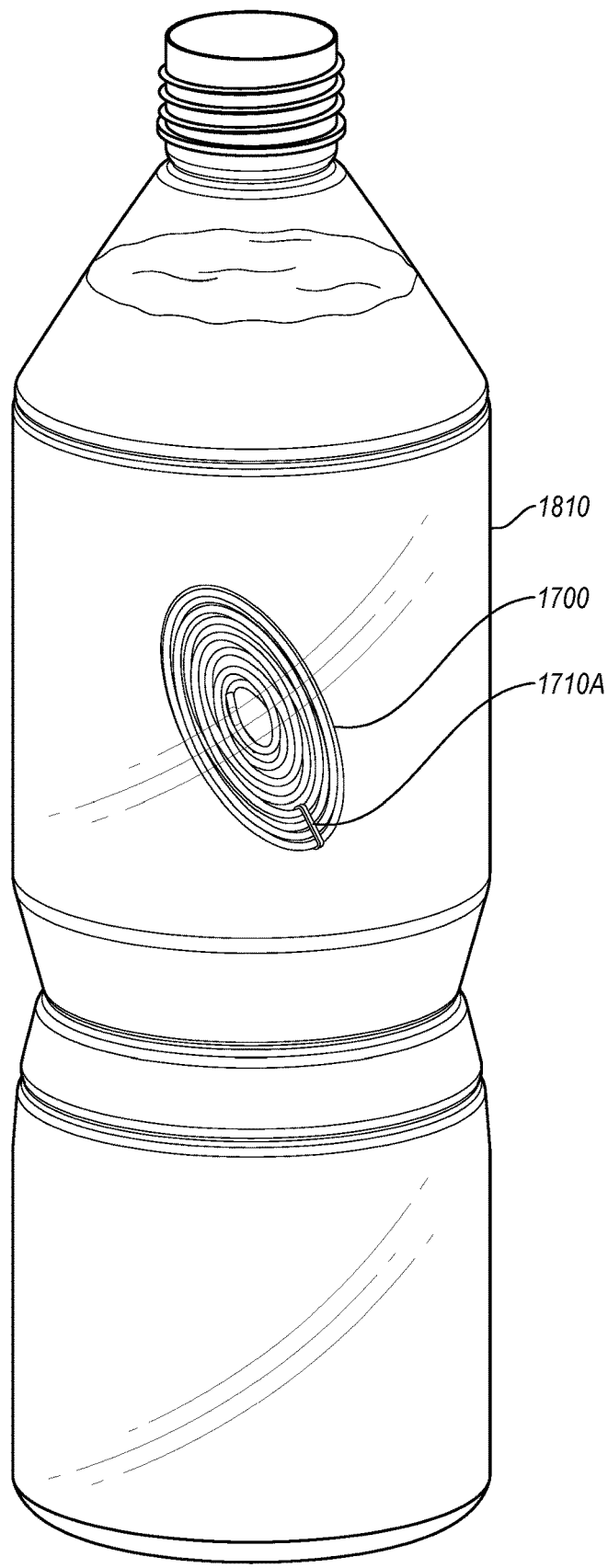
FIG. 18A illustrates the agitator of FIG. 17A retained in the compressed configuration by the retainer of FIG. 17A within an example container in accordance with some embodiments.

FIG. 18A illustrates the agitator 1700 of FIG. 17A retained in the compressed configuration by the retainer 1710A of FIG. 17A within an example container 1810 in accordance with some embodiments. More generally, any of the retainers 1710 may be used in this or other implementations. The container 1810 may be the same as or similar to the container 310 of FIGS. 3-4. In some embodiments, maintaining the agitator 1700 in the compressed configuration may include inhibiting expansion of the agitator 1700 via the retainer 1710A for a period of time. The period of time in which the agitator 1700 is maintained in the compressed configuration may be seconds, minutes, hours, days, weeks, months, years, etc. Additionally or alternatively, the period of time in which the agitator 1700 is inhibited from expanding to the expanded configuration via the retainer 1710A may depend on one or more factors. Some factors affecting the retainer 1710A and the period of time may include a shaking event (e.g., the container 1810 being shaken by a user, etc.), an amount of kinetic energy of the materials in the container 1810 (e.g., temperature of the materials, pressure on the materials, etc.), a degree of solubility of the retainer 1710A, a pH level of the materials in the container 1810, an impact force against walls of the container 1810, etc. In these or other embodiments, the factors may lengthen or shorten the period of time (e.g., accelerate or decelerate a release of the retainer 1710A from the agitator 1700).

Thus, in some embodiments, the agitator 1700 as shown in FIG. 18A may be compressed prior to inserting the agitator 1700 through the neck (e.g., neck 305) of the container 1810. In some embodiments, after compressing the agitator 1700 and prior to inserting the agitator 1700 through the neck of the container 1810, the agitator 1700 may be maintained in the compressed configuration. For example, the agitator 1700 may be compressed to the compressed configuration and maintained in the compressed configuration by attaching the retainer 1710A to the agitator 1700 to inhibit expansion of the agitator 1700 until the retainer 1710A is at least partially removed from the agitator 1700.

Figure 18B:
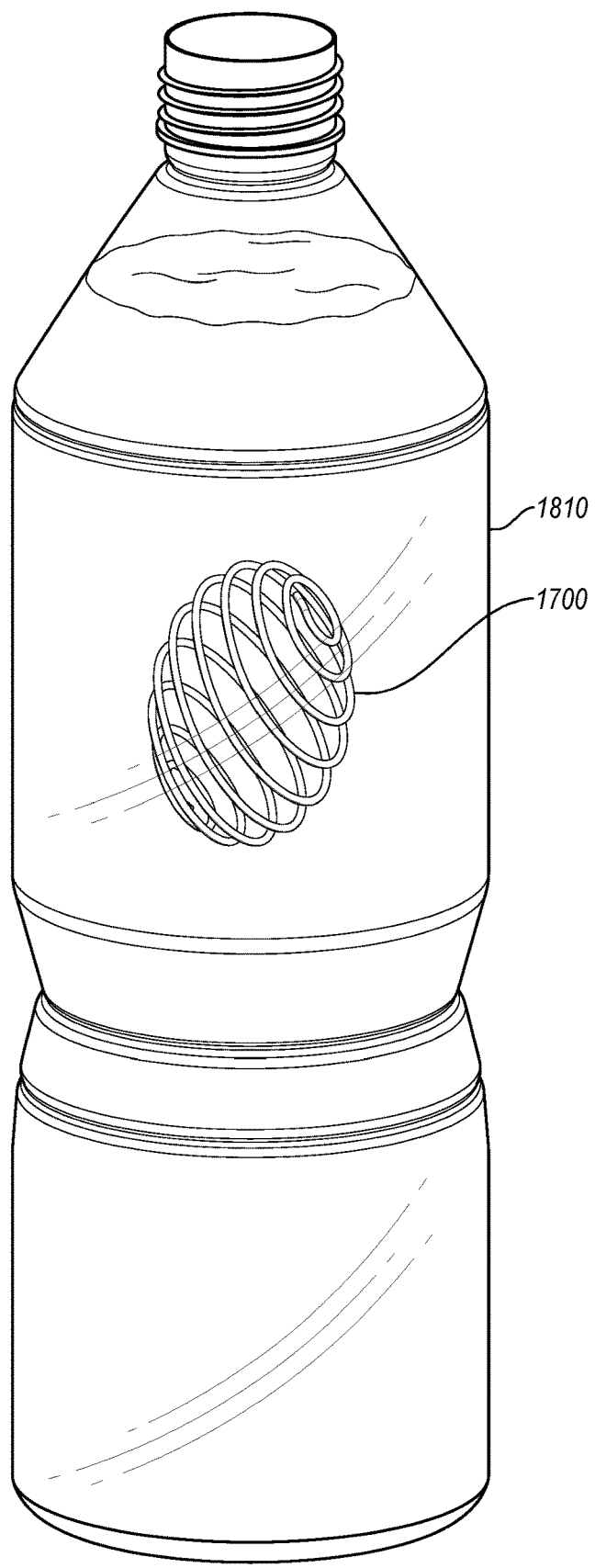
FIG. 18B illustrates the agitator of FIG. 17A in the expanded configuration within the container of FIG. 18A in accordance with some embodiments.

FIG. 18B illustrates the agitator 1700 of FIG. 17A in the expanded configuration within the container 1810 of FIG. 18A in accordance with some embodiments. For example, the agitator 1700 may expand from the compressed configuration as illustrated in FIG. 18A to the expanded configuration as illustrated in FIG. 18B after at least partial removal of the retainer 1710A from the agitator 1700. Additionally or alternatively, in some embodiments, the retainer 1710A may be released from the agitator 1700 in response to the retainer 1710A being in contact with a liquid in the container 1810. For example, at least a portion of the retainer 1710A may be water-soluble, and the retainer 1710A may partially or fully dissolve to at least partially release from at least one member of the one or more members of the agitator 1700 to enable the agitator 1700 to expand to the expanded configuration. The retainer may be non-toxic and safe for ingestion.

In some embodiments of the disclosed technology, one or more containers described herein may be used to store, transport, and/or dispense one or more liquids, such as water, beverages, drinks, juices, vitamin enhanced beverages, energy drinks, thirst-quenchers, flavored waters, protein drinks, shakes, foodstuffs, dressings, sauces, liquid meal replacements, solutions, suspensions, and the like. The container may also be used to store, transport, and/or dispense solutions and/or solids such as energy drinks, protein drinks, shakes, liquid meal replacements, etc.

In some embodiments, the container may be a shaker cup and the contents may be shaken, stirred, and/or mixed as desired, such as supplements, vitamins, protein powders, etc. This may allow the container to be used to create protein drinks, shakes, smoothies, dressings, sauces, etc. The container may be used as a water bottle in which water and other types of fluids may be transported and/or consumed. The container could further include foodstuffs such as fruits, vegetables, soups, and the like.

Advantageously, in some embodiments, the container may be reusable and refillable, which may allow the container to be used for many different purposes over an extended period of time. The container may also be easily carried and portable. For example, the container may be conveniently held in one-hand by the user and/or may have a carry loop. Additionally, the container may be insulated to help keep the contents at a desired temperature, such as at a lower or higher temperature.

In some embodiments, the container may include a small number of parts and components, which may facilitate manufacturing and assembly. In some embodiments, the container may be easily disassembled and cleaned. As discussed elsewhere, the container may include a container lid and/or a closure that allows the container to be easily filled from various sources. The container, container body, and container lid may include any number of parts and components depending, for example, upon the intended use of the container.

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause, e.g., Clause 1, 11, or 20. The other clauses can be presented in a similar manner. The following is a non-limiting summary of some examples presented herein:

Clause 1. A method comprising:
inserting an agitator into a container through a neck of the container; and
expanding the agitator within the container so that the agitator does not fit through the neck of the container.

Clause 2. The method of clause 1, wherein expanding the agitator includes expanding the agitator portion by portion as the agitator advances portion by portion past the neck of the container.

Clause 3. The method of clause 1, wherein expanding the agitator comprises at least one of:
expanding the agitator so that the agitator is too large to fit through the neck of the container in any orientation of the agitator relative to the neck;
expanding the agitator so that the agitator has at least two of a length dimension, a width dimension, and a height dimension that is each greater than one or more of:
an inner diameter of the neck of the container;
the inner diameter of the neck of the container divided by sin(45°); or
the inner diameter of the neck of the container plus a height of the neck of the container,
wherein the length dimension, the width dimension, and the height dimension are mutually orthogonal;
expanding the agitator so that the agitator has the length dimension, the width dimension, and the height dimension that is each greater than 0.75 inches;
expanding the agitator so that the agitator is at least 0.5 inches by 0.5 inches in two mutually orthogonal dimensions; or
expanding the agitator so that at least one of the length dimension, the width dimension, and the height dimension increases from a compressed to an expanded configuration by at least a predetermined percentage or by at least a predetermined amount.

Clause 4. The method of clause 1, further comprising compressing the agitator.

Clause 5. The method of clause 4, wherein compressing the agitator comprises adjusting one or more members of the agitator from an expanded configuration to a compressed configuration, and wherein the one or more members is each adjustable in at least one of a length dimension, a width dimension, or a height dimension.

Clause 6. The method of clause 4, wherein the agitator is compressed prior to inserting the agitator through the neck of the container.

Clause 7. The method of clause 6, further comprising, after compressing the agitator and prior to inserting the agitator through the neck of the container, maintaining the agitator in a compressed configuration.

Clause 8. The method of clause 7, further comprising attaching a retainer to at least a portion of the agitator to maintain the agitator in the compressed configuration, the retainer configured to inhibit expansion of the agitator.

Clause 9. The method of clause 8, further comprising releasing the retainer from the agitator within the container.

Clause 10. The method of clause 9, wherein releasing the retainer from the agitator within the container comprises releasing the retainer from the agitator within the container in response to the retainer being in contact with a liquid in the container.

Clause 11. A mixing system comprising:
a container comprising a neck having an opening therein; and
an agitator having an expanded configuration and a compressed configuration, the agitator being adjustable between the expanded configuration and the compressed configuration in at least one of a length dimension, a width dimension, or a height dimension, the agitator in the expanded configuration being too large to fit through the neck of the container in any orientation of the agitator relative to the neck, the agitator in the compressed configuration being small enough to fit through the neck of the container in at least one orientation of the agitator relative to the neck, and the agitator being biased to the expanded configuration in absence of external force applied to the agitator.

Clause 12. The mixing system of clause 11, wherein:
in the expanded configuration in which the agitator is too large to fit through the neck of the container in any orientation of the agitator relative to the neck, at least one of:
two or more of the length dimension, the width dimension, and the height dimension is each greater than one or more of:
an inner diameter of the neck of the container;
the inner diameter of the neck of the container divided by sin(45°); or
the inner diameter of the neck of the container plus a height of the neck of the container,
wherein the length dimension, the width dimension, and the height dimension are mutually orthogonal;
the length dimension, the width dimension, and the height dimension is each greater than 0.75 inches;
the agitator is at least 0.5 inches by 0.5 inches in two mutually orthogonal dimensions; or
at least one of the length dimension, the width dimension, and the height dimension in the expanded configuration is at least a predetermined percentage or at least a predetermined amount greater than in the compressed configuration.

Clause 13. The mixing system of clause 11, wherein:
in the compressed configuration in which the agitator is small enough to fit through the neck of the container in at least one orientation of the agitator relative to the neck, at least one of:
two or more of the length dimension, the width dimension, and the height dimension is each smaller than one or more of:
an inner diameter of the neck of the container;
the inner diameter of the neck of the container divided by sin(45°); or
the inner diameter of the neck of the container plus a height of the neck of the container;
at least one of the length dimension, the width dimension, and the height dimension is smaller than 0.75 inches;
the agitator is smaller than 0.5 inches by 0.5 inches in two mutually orthogonal dimensions; or
at least one of the length dimension, the width dimension, and the height dimension in the compressed configuration is at least a predetermined percentage or at least a predetermined amount less than in the expanded configuration.

Clause 14. The mixing system of clause 11, wherein the agitator comprises at least one of metal and polymer.

Clause 15. The mixing system of clause 11, wherein the agitator comprises a frame structure and wherein in the expanded configuration:
the frame structure comprises a primary coil shape that has at least one of a toroidal, spherical, ellipsoid, prolate, or spheroid shape; and
the frame structure comprises a secondary coil shape that has at least one of a circular, hemispherical, wedge, ellipsoid, or prolate shape.

Clause 16. The mixing system of clause 11, wherein the agitator comprises a frame structure and wherein the frame structure in the expanded configuration comprises one or more of: a bend, a fold, a turn, a spiral, a slot, an aperture, a spoke, or a flange.

Clause 17. The mixing system of clause 11, further comprising a package in which the agitator is configured to be packaged and removed therefrom.

Clause 18. The mixing system of clause 11, wherein the agitator comprises one or more members that adjust between the expanded configuration and the compressed configuration of the agitator to alter at least one of the length dimension, the width dimension, or the height dimension of the agitator, the agitator further comprising a retainer attached to at least one of the one or more members to maintain the one or more members in the compressed configuration.

Clause 19. The mixing system of clause 18, wherein at least a portion of the retainer is water-soluble.

Clause 20. An agitator comprising:
one or more members adjustable between an expanded configuration and a compressed configuration,
wherein when the one or more members are in the expanded configuration, the agitator in a first set of two orthogonal dimensions is larger than an opening having a predetermined size;
wherein when the one or more members are in the compressed configuration, the agitator in a second set of two orthogonal dimensions is smaller than the opening having the predetermined size, and
wherein the one or more members are biased to the expanded configuration in absence of external force applied to the one or more members.

Clause 21. The agitator of clause 20, wherein the one or more members comprises at least one of metal and polymer.

Clause 22. The agitator of clause 20, wherein the agitator further comprises a frame structure and wherein the frame structure comprises a primary coil shape and a secondary coil shape.

Clause 23. The agitator of clause 22, wherein in the expanded configuration:
the primary coil shape has at least one of a toroidal, spherical, ellipsoid, prolate, or spheroid shape; and
the secondary coil shape has at least one of a circular, hemispherical, D-shaped, ellipsoid, or prolate shape.

Clause 24. The agitator of clause 22, wherein the frame structure in the expanded configuration comprises one or more of: a bend, a fold, a turn, a spiral, a slot, an aperture, a spoke, or a flange.

Clause 25. The agitator of clause 20, wherein the one or more members collectively form a polyhedral structure or a conical structure.

Clause 26. The agitator of clause 20, further comprising a weight coupled to the one or more members.

Clause 27. The agitator of clause 26, wherein:
the one or more members include a compressible material;
the one or more members at least partially cover the weight; and
the one or more members protrude from the weight.

Clause 28. The agitator of clause 26, further comprising a shaft within which the weight is disposed, wherein the one or more members include at least one of:
a first end fixed to a first end of the shaft and a second end slidably coupled to the shaft between the first end and a second end of the shaft that is opposite the first end; or
a ring and one or more spokes that couple the ring to the shaft.

Clause 29. The agitator of clause 20, further comprising a retainer attached to the one or more members to maintain the one or more members in the compressed configuration.

Clause 30. The agitator of clause 29, wherein the retainer is configured to at least partially release from at least one member of the one or more members in response to the retainer being in contact with a liquid.

Clause 31. The agitator of clause 29, wherein:
at least a portion of the retainer is water-soluble; and
in response to being in contact with a liquid, the retainer is configured to at least partially dissolve and at least partially release from at least one member of the one or more members.

Clause 32. The agitator of clause 20, wherein the first set of two orthogonal dimensions is identical to the second set of two orthogonal dimensions.

Clause 33. The agitator of clause 20, wherein the first set of two orthogonal dimensions includes a length dimension and a height dimension of the agitator, and wherein the second set of two orthogonal dimensions includes the height dimension and a width dimension of the agitator.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Moreover, nothing disclosed herein is intended to be dedicated to the public regardless of whether such disclosure is explicitly recited in the above description.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. Also, the terminology used herein is for the purpose of describing particular embodiments only, and is not intended to be limiting.

With respect to the use of substantially any plural and/or singular terms herein, the plural terms may include the singular terms and/or the singular terms may include the plural terms as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting.

What is claimed is:

1. An agitator for mixing a beverage, the agitator comprising:
   a frame structure forming a spiral with turns of different sizes,
   wherein the frame structure has a compressed configuration and an expanded configuration,
   wherein, in the expanded configuration, an overall width of the frame structure is less than an overall height of the frame structure and less than an overall length of the frame structure,
   wherein, in the expanded configuration, from a first direction the agitator defines an overall circular shape, and from a second direction orthogonal to the first direction the agitator defines an overall ovular shape,
wherein, in the compressed configuration, the overall height of the frame structure is equal to or less than the overall width of the frame structure, and
wherein the frame structure is biased to the expanded configuration, and expands to the expanded configuration from the compressed configuration upon removal of an applied force maintaining the frame structure in the compressed configuration.

2. The agitator of claim 1, wherein the frame is a single continuous wire formed of food-grade material.

3. The agitator of claim 1, wherein, in the expanded configuration, two or more of the overall length of the frame structure, the overall width of the frame structure, and the overall height of the frame structure are each greater than 1 inch, and
wherein, in the compressed configuration, two or more of the overall length of the frame structure, the overall width of the frame structure, and the overall height of the frame structure are each less than 1 inch.

4. The agitator of claim 1, wherein, in the expanded configuration, two or more of the overall length of the frame structure, the overall width of the frame structure, and the overall height of the frame structure are each greater than 1.25 inches, and
wherein, in the compressed configuration, two or more of the overall length of the frame structure, the overall width of the frame structure, and the overall height of the frame structure are each less than 1.25 inches.

5. The agitator of claim 1, wherein the agitator comprises a retainer attached to the frame structure to maintain the agitator in the compressed configuration.

6. The agitator of claim 5, wherein at least a portion of the retainer is water-soluble.

7. A beverage mixing system comprising:
a beverage container; and
the agitator of claim 1.

8. The beverage mixing system of claim 7, wherein the beverage container comprises a neck having an opening therein,
wherein, in the expanded configuration, the agitator does not fit through the opening of the neck of the container in any orientation of the agitator relative to the opening, and
wherein, in the compressed configuration, the agitator fits through the opening of the neck of the container in at least one orientation of the agitator relative to the opening.

9. The beverage mixing system of claim 8, wherein, in the expanded configuration, two or more of a length dimension, a width dimension, and a height dimension of the agitator are each greater than an inner diameter of the neck of the container,
wherein, in the compressed configuration, two or more of the length dimension, the width dimension, and the height dimension are each less than the inner diameter of the neck of the container, and
wherein the length dimension, the width dimension, and the height dimension are mutually orthogonal.

10. The beverage mixing system of claim 8, wherein the beverage container is transparent, and
wherein the neck of the beverage container has external threads formed thereon.

11. The beverage mixing system of claim 8, wherein the spiral changes in size with each turn of the spiral.

12. The beverage mixing system of claim 8, wherein, in the expanded configuration, the frame structure forms one or more of: a bend, a fold, a turn, a slot, an aperture, a spoke, or a flange.

13. The beverage mixing system of claim 8, further comprising a package containing the agitator and retaining the agitator in the compressed configuration.

14. The beverage mixing system of claim 8, wherein the agitator comprises a retainer attached to the frame structure to maintain the agitator in the compressed configuration.

15. A method for mixing a beverage, the method comprising:
inserting the agitator of claim 1 in a compressed configuration into a container through a neck of the container; and
expanding the agitator to an expanded configuration within the container,
wherein the agitator will not fit through the neck of the container in the expanded configuration.

16. The method of claim 15, further comprising compressing the agitator from the expanded configuration to the compressed configuration before inserting the agitator into the container.

17. The method of claim 16, wherein compressing the agitator comprises reducing a single one of a one of a length dimension, a width dimension, and a height dimension of the agitator.

18. The method of claim 16, further comprising:
attaching a retainer to at least a portion of the agitator to maintain the agitator in the compressed configuration; and
releasing the retainer from the agitator within the container.

19. The method of claim 16, further comprising:
packaging the agitator in the compressed configuration; and
maintaining the agitator in the compressed configuration within the packaging.

20. The method of claim 15, wherein expanding the agitator occurs as a result of the bias of the agitator to the expanded position.

21. The method of claim 15, wherein expanding the agitator includes expanding the agitator portion by portion as the agitator advances portion by portion through the neck of the container.

22. An agitator for mixing a beverage, the agitator comprising:
a frame structure forming a spiral with turns of different sizes, the frame structure having a compressed configuration and an expanded configuration; and
a retainer attached to the frame structure to maintain the agitator in the compressed configuration,
wherein, in the expanded configuration, an overall width of the frame structure is less than an overall height of the frame structure and less than an overall length of the frame structure,
wherein, in the compressed configuration, the overall height of the frame structure is equal to or less than the overall width of the frame structure, and
wherein the frame structure is biased to the expanded configuration, and expands to the expanded configuration from the compressed configuration upon removal of an applied force maintaining the frame structure in the compressed configuration.

23. The agitator of claim 22, wherein at least a portion of the retainer is water-soluble.

24. A beverage mixing system comprising:
a beverage container; and
the agitator of claim 22.

25. A method for mixing a beverage, the method comprising:
   inserting the agitator of claim 22 in a compressed configuration into a container through a neck of the container; and
   expanding the agitator to an expanded configuration within the container,
   wherein the agitator will not fit through the neck of the container in the expanded configuration.

26. The method of claim 25, further comprising releasing the retainer from the agitator within the container.

* * * * *